United States Patent
Yoon

(10) Patent No.: US 12,541,795 B1
(45) Date of Patent: *Feb. 3, 2026

(54) ENHANCED ULTRA LOW-LATENCY, HIGH-THROUGHPUT MATCHING ENGINE FOR ELECTRONIC TRADING SYSTEMS

(71) Applicant: Jin Seok Yoon, Elmwood Park, NJ (US)

(72) Inventor: Jin Seok Yoon, Elmwood Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/260,613

(22) Filed: Jul. 7, 2025

Related U.S. Application Data

(63) Continuation-in-part of application No. 19/080,927, filed on Mar. 16, 2025.

(51) Int. Cl.
*G06Q 40/04* (2012.01)
*G06F 9/30* (2018.01)
(Continued)

(52) U.S. Cl.
CPC ......... *G06Q 40/04* (2013.01); *G06F 9/30038* (2023.08); *G06F 9/3887* (2013.01);
(Continued)

(58) Field of Classification Search
CPC ... G06Q 40/04; G06F 9/30038; G06F 9/3887; G06F 9/5022; G06F 9/546; G06F 2209/503; G06F 2209/548
See application file for complete search history.

(56) References Cited

U.S. PATENT DOCUMENTS

| 7,788,163 B2 | 8/2010 | Troxel, Jr. et al. |
| 7,895,112 B2 | 2/2011 | Richmann et al. |

(Continued)

FOREIGN PATENT DOCUMENTS

| EP | 2932455 A1 | 10/2015 |
| EP | 3692492 A1 | 8/2020 |

(Continued)

OTHER PUBLICATIONS

Zoican, Marius: Dealing with micro-bursts: A congestion fee for high-speed markets, May 2, 2020, Medium, pp. 1-13. (Year: 2020).*

(Continued)

*Primary Examiner* — Bijendra K Shrestha

(57) ABSTRACT

A high-speed matching-engine architecture is disclosed that sustains deterministic sub-microsecond latency while processing more than 10 million order messages per second per core on commodity multi-core processors. Orders reside in cache-aligned Data Holder Nodes whose occupancy and price-level boundaries are tracked with constant-time bitmask operations, eliminating pointer-chasing penalties. Percore huge-page pools, SIMD copy kernels, and lock-free, cache-line-aligned queues further minimize TLB misses and coherence overheads. Overflow is handled by Push Back/Push Forward cascades that relocate the least- or most-prioritized orders between adjoining nodes without violating price-time priority. Node capacities vary monotonically with book depth and are re-tuned online by a lightweight machine-learning controller that maximizes cache-hit probability under changing market micro-structure. The design tightens spreads, raises match-rate revenue, and complies with stringent regulatory latency caps using standard x86-64, Arm, or other architectures.

30 Claims, 20 Drawing Sheets

(51) Int. Cl.
  *G06F 9/38* (2018.01)
  *G06F 9/50* (2006.01)
  *G06F 9/54* (2006.01)

(52) U.S. Cl.
  CPC ............ *G06F 9/5022* (2013.01); *G06F 9/546* (2013.01); *G06F 2209/503* (2013.01); *G06F 2209/548* (2013.01)

(56) References Cited

U.S. PATENT DOCUMENTS

| | | | |
|---|---|---|---|
| 8,082,206 | B2 | 12/2011 | Troxel, Jr. et al. |
| 8,489,792 | B2 * | 7/2013 | Byrne ................ G06F 13/4027 709/230 |
| 8,868,460 | B2 | 10/2014 | Liberman et al. |
| 9,047,243 | B2 * | 6/2015 | Taylor .................. G06F 15/167 |
| 10,395,316 | B2 | 8/2019 | Milne et al. |
| 10,545,758 | B2 | 1/2020 | Truta |
| 10,846,795 | B2 | 11/2020 | Kodde et al. |
| 11,088,959 | B1 | 8/2021 | Amicangioli et al. |
| 11,263,203 | B2 | 3/2022 | Barve et al. |
| 11,609,782 | B2 | 3/2023 | Ahlqvist et al. |
| 11,669,904 | B2 | 6/2023 | Jensen et al. |
| 11,797,480 | B2 | 10/2023 | Ostrovski |
| 11,961,140 | B2 | 4/2024 | Howorka et al. |
| 12,045,885 | B2 | 7/2024 | Djurdjevic et al. |
| 12,248,984 | B2 | 3/2025 | Tilfors |
| 12,288,254 | B2 | 4/2025 | Merold et al. |
| 12,340,416 | B2 | 6/2025 | Liberman et al. |
| 2005/0197971 | A1 * | 9/2005 | Kettner ................ G06Q 10/087 705/400 |
| 2021/0272201 | A1 | 9/2021 | Ginis et al. |
| 2024/0212045 | A1 | 6/2024 | Howorka et al. |

FOREIGN PATENT DOCUMENTS

| | | | |
|---|---|---|---|
| EP | 3644196 B1 | 5/2022 | |
| EP | 2858025 B1 | 2/2025 | |
| WO | WO2014/093859 A1 | 6/2014 | |
| WO | WO-2016103055 A1 * | 6/2016 | ........... G06F 16/322 |
| WO | WO-2022031878 A1 * | 2/2022 | ........... G06F 11/2023 |
| WO | WO-2024163814 A2 * | 8/2024 | ........... H04L 51/234 |

OTHER PUBLICATIONS

Bilokon et al.: C++ Design Patterns for Low-Latency Applications including High-Frequency Trading, Sept. 8, 2023, pp. 1-50 ( Year: 2023).*

Mondal, Abhijit: Demystifying CPU Caches with Examples, Nov. 22, 2023, Medium, pp. 1-31 (Year: 2023).*

Biswas, Amitava: Designing Low Latency High Performance Order Matching Engine, Aug. 17, 2023, Medium, pp. 1-33 (Year: 2023).*

Jericevich Ivan; Sing Dharmesh; Gebbie Tim, CoinTossX: An open-source low-latency high-throughput matching engine, SoftwareX, Jul. 2022.

Michael Maged M.; Scott Michael L., Simple, Fast, and Practical Non-Blocking and Blocking Concurrent Queue Algorithms, Proc. 15th ACM Symp. on Principles of Distributed Computing, May 1996.

Pagh Rasmus; Rodler Flemming F.., Cuckoo hashing, Journal of Algorithms, May 2004, Elsevier.

Liu Yujie; Spear Michael, A Lock-Free, Array-Based Priority Queue, Lehigh Univ. CSE Tech. Report LU-CSE-11-004. 2011.

Benomar Ziyad; Coester Christian, Learning-Augmented Priority Queues, Proc. 38th NeurIPS Conference, 2024.

Skarupke Malte, On Modern Hardware the Min-Max Heap beats a Binary Heap, Probably Dance (blog), Aug. 31, 2020.

Zaderykhin Oleksii, Millions of orders per second matching engine testing, Habr (online article), Oct. 1, 2021.

Panwar Gagandeep; Laghari Muhammad; Choukse Esha; Jian Xun, DyLeCT: Achieving Huge-page-like Translation Performance for Hardware-compressed Memory, Proc. 50th IEEE/ACM Int'l Symp. on Computer Architecture (ISCA 2024).

Yang Hanmei; Zhao Xin; Zhou Jin; Wang Wei; Kundu Sandip; Wu Bo; Guan Hui; Liu Tongping, NUMAlloc: A Faster NUMA Memory Allocator, Proc. ACM SIGPLAN Int. Symp. on Memory Management (ISMM 2023).

Thompson Martin; Farley Dave; Barker Michael; Gee Patricia; Stewart Andrew, Disruptor: High Performance Alternative to Bounded Queues for Exchanging Data Between Concurrent Threads, LMAX Exchange Whitepaper v1.0, May 2011.

He, Conghui et al., "Exploring the Potential of Reconfigurable Platforms for Order Book Update," 2017 IEEE 25th Annual International Symposium on Field-Programmable Custom Computing Machines (FCCM), 2017, pp. 1-8, IEEE.

Krapivensky, Viktor, "glass: ordered set data structure for client-side order books," arXiv, Jun. 16, 2025, pp. 1-33, arXiv:2506. 13991v1, arXiv.org, Ithaca, NY, USA.

Cook, Carl, "When a Microsecond Is an Eternity: High Performance Trading Systems in C++," CppCon 2017, Sep. 28, 2017, pp. 1-55, Bellevue, WA, USA.

Supermarine Software, "Optimistic Parallel Order Books," Nov. 7, 2020, pp. 1-8, Supermarine Software.

Various, "What is an efficient data structure to model order book?," Quantitative Finance Stack Exchange, Apr. 28, 2021, pp. 1-7, Stack Exchange Inc., New York, NY, USA.

Frey, Sascha et al., "JAX-LOB: A GPU-Accelerated limit order book simulator to unlock large scale reinforcement learning for trading," arXiv, Aug. 25, 2023, pp. 1-9, arXiv:2308.13289v1, arXiv. org, Ithaca, NY, USA.

* cited by examiner

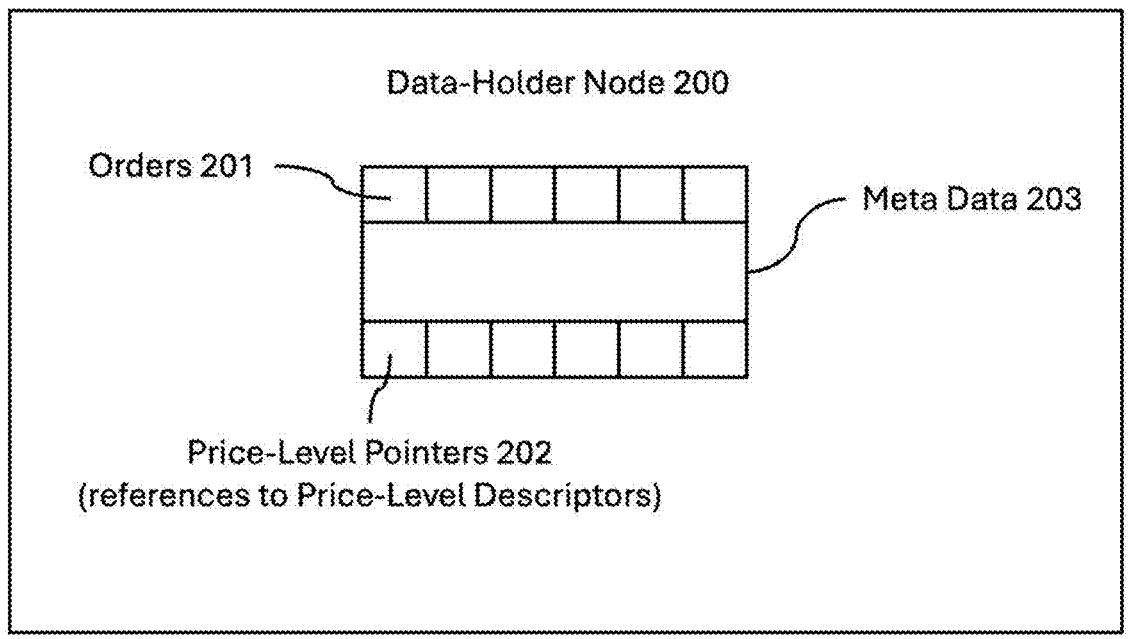
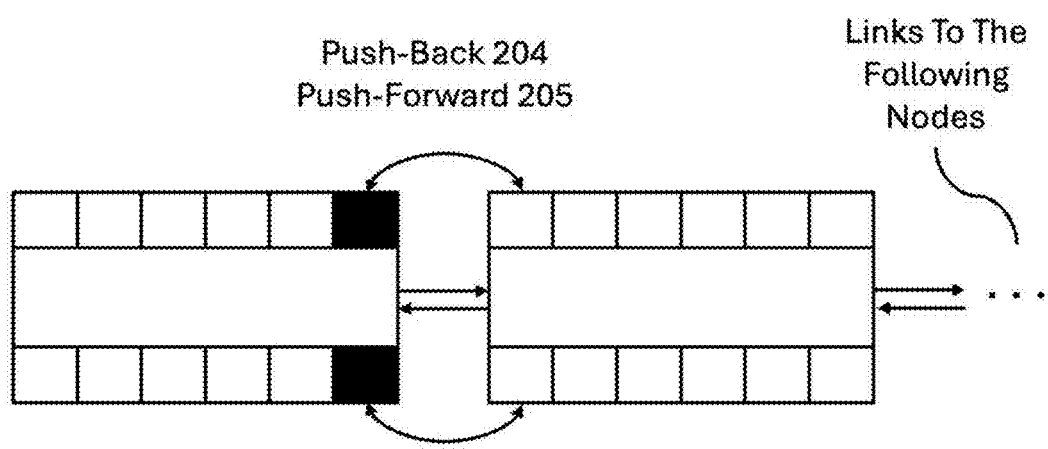
FIG 2

Orders To Be Executed ← Incoming Buy Order at Price 95, Qty 10.

| Price: 95 Qty: 5 | Price: 95 Qty: 7 | Price: 95 Qty: 13 | Price: 95 Qty: 88 | Price: 99 Qty: 3 | Price: 99 Qty: 5 |
|---|---|---|---|---|---|
| Sell Orders Node ||||||
| Price Level 95 Starting | Empty (0x0) | Empty (0x0) | Price Level 95 Ending | Price Level 99 Starting | Price Level 99 Ending |

Previous State

| Price: 95 Qty: 2 | Price: 95 Qty: 13 | Price: 95 Qty: 88 | Price: 99 Qty: 3 | Price: 99 Qty: 5 | Empty |
|---|---|---|---|---|---|
| ← Orders and Price-Level Pointers have shifted to the left. ← ||||||
| Price Level 95 Starting | Empty (0x0) | Price Level 95 Ending | Price Level 99 Starting | Price Level 99 Ending | Empty (0x0) |

Post-Processing State

FIG 10

*Appending a Sell Order at Price 95, Qty 10.

| Price: 95 Qty: 5 | Price: 95 Qty: 7 | Price: 95 Qty: 13 | Price: 95 Qty: 88 | Empty | Empty |
|---|---|---|---|---|---|
| \multicolumn{6}{c}{Sell Orders Node} | | | | | |
| Price Level 95 Starting | Empty (0x0) | Empty (0x0) | Price Level 95 Ending | Empty (0x0) | Empty (0x0) |

Previous State

| Price: 95 Qty: 5 | Price: 95 Qty: 7 | Price: 95 Qty: 13 | Price: 95 Qty: 88 | Price: 95 Qty: 10 | Empty |
|---|---|---|---|---|---|
| The newly inserted order has the lowest priority at price 95. Moved to the next slot. | | | | | |
| Price Level 95 Starting | Empty (0x0) | Empty (0x0) | Empty (0x0) | Price Level 95 Ending | Empty (0x0) |

Post-Processing State

Now, the lowest priority pointer at Price Level 95 corresponds to the newly inserted order.

FIG 11

*Prepending a Sell Order at Price 93, Qty 10.

| Price: 95 Qty: 5 | Price: 95 Qty: 7 | Price: 95 Qty: 13 | Price: 95 Qty: 88 | Empty | Empty |
|---|---|---|---|---|---|
| Sell Orders Node ||||||
| Price Level 95 Starting | Empty (0x0) | Empty (0x0) | Price Level 95 Ending | Empty (0x0) | Empty (0x0) |

Previous State

| Price: 93 Qty: 10 | Price: 95 Qty: 5 | Price: 95 Qty: 7 | Price: 95 Qty: 13 | Price: 95 Qty: 88 | Empty |
|---|---|---|---|---|---|
| Orders and Price Level Pointers have shifted to the right. ||||||
| Price 93 Starting / Ending | Price Level 95 Starting | Empty (0x0) | Empty (0x0) | Price Level 95 Ending | Empty (0x0) |

Post-Processing State

The newly inserted order has the highest priority in this node. (lowest ask)

FIG 12

*Appending a Sell Order at Price 95, Qty 10 to a Sell Orders Node.

| Price: 95 Qty: 5 | Price: 95 Qty: 7 | Price: 95 Qty: 13 | Price: 95 Qty: 88 | Price 98 Qty: 27 | Price: 98 Qty: 45 |
|---|---|---|---|---|---|
| \multicolumn{6}{c}{The lowest priority order before appending gets "pushed back". (see 204 in FIG. 2) This order is treated as a "prepending" at the succeeding node. (see FIG. 12)} |
| Price Level 95 Starting | Empty (0x0) | Empty (0x0) | Price Level 95 Ending | Price Level 98 Starting | Price Level 98 Ending |

Previous State

| Price: 95 Qty: 5 | Price: 95 Qty: 7 | Price: 95 Qty: 13 | Price: 95 Qty: 88 | Price: 95 Qty: 10 | Price 98 Qty: 27 |
|---|---|---|---|---|---|
| \multicolumn{6}{c}{Now, the lowest priority pointer at Price Level 95 corresponds to the newly inserted order.} |
| Price Level 95 Starting | Empty (0x0) | Empty (0x0) | Empty (0x0) | Price Level 95 Ending | Price Level 98 Starting |

Post-Processing State

FIG 13

*Prepending a Sell Order at Price 95, Qty 10 to a Sell Orders Node.

| Price: 93 Qty: 5 | Price: 95 Qty: 7 | Price: 95 Qty: 13 | Price: 95 Qty: 88 | Price 98 Qty: 27 | Price: 98 Qty: 45 |
|---|---|---|---|---|---|
| | | | | | |

The highest priority order before prepending gets "pushed forward". (see 205 in FIG. 2) This order is treated as a "appending" at the preceding node. (see FIG. 11)

| Price 93 Starting / Ending | Price Level 95 Starting | Empty (0x0) | Price Level 95 Ending | Price Level 98 Starting | Price Level 98 Ending |
|---|---|---|---|---|---|

Previous State

| Price: 95 Qty: 10 | Price: 95 Qty: 7 | Price: 95 Qty: 13 | Price: 95 Qty: 88 | Price: 98 Qty: 27 | Price 98 Qty: 45 |
|---|---|---|---|---|---|

Now, the highest priority pointer at Price Level 95 corresponds to the newly inserted order.

| Price Level 95 Starting | Empty (0x0) | Empty (0x0) | Price Level 95 Ending | Price Level 98 Starting | Price Level 98 Ending |
|---|---|---|---|---|---|

Post-Processing State

FIG 14

Orders To Be Executed ← Incoming Buy Order at Price 95, Qty 10.

| Price: 95 Qty: 5 | Price: 95 Qty: 7 | Price: 95 Qty: 13 | Price: 95 Qty: 88 | Price: 99 Qty: 3 | Price: 99 Qty: 5 |

Sell Orders Node

| Highest-Priority Bitmask: 010001 | Lowest-Priority Bitmask: 101000 |

Previous State

| Price: 95 Qty: 2 | Price: 95 Qty: 13 | Price: 95 Qty: 88 | Price: 99 Qty: 3 | Price: 99 Qty: 5 | Empty |

← The orders have moved left, and the corresponding bit positions have shifted downward.

| Highest-Priority Bitmask: 001001 | Lowest-Priority Bitmask: 010100 |

Post-Processing State

FIG 16

*Appending a Sell Order at Price 95, Qty 10.

| Price: 95 Qty: 5 | Price: 95 Qty: 7 | Price: 95 Qty: 13 | Price: 95 Qty: 88 | Empty | Empty |
|---|---|---|---|---|---|

Sell Orders Node

| Highest-Priority Bitmask: 000001 | Lowest-Priority Bitmask: 001000 |
|---|---|

Previous State

| Price: 95 Qty: 5 | Price: 95 Qty: 7 | Price: 95 Qty: 13 | Price: 95 Qty: 88 | Price: 95 Qty: 10 | Empty |
|---|---|---|---|---|---|

The newly inserted order has the lowest priority at Price Level 95.

| Highest-Priority Bitmask: 000001 | Lowest-Priority Bitmask: 010000 |
|---|---|

Post-Processing State

The Lowest-Priority Bitmask has shifted up to reflect that change.

FIG 17

*Prepending a Sell Order at Price 93, Qty 10.

| Price: 95 Qty: 5 | Price: 95 Qty: 7 | Price: 95 Qty: 13 | Price: 95 Qty: 88 | Empty | Empty |
|---|---|---|---|---|---|

Sell Orders Node

| Highest-Priority Bitmask: 000001 | Lowest-Priority Bitmask: 001000 |
|---|---|

Previous State

| Price: 93 Qty: 10 | Price: 95 Qty: 5 | Price: 95 Qty: 7 | Price: 95 Qty: 13 | Price: 95 Qty: 88 | Empty |
|---|---|---|---|---|---|

→

The orders have moved right, and the corresponding bit positions have shifted upward.

| Highest-Priority Bitmask: 000011 | Lowest-Priority Bitmask: 010001 |
|---|---|

Post-Processing State

The newly inserted order is the sole order at Price Level 93, thus have both Highest- and Lowest-Priority bit designations

FIG 18

*Appending a Sell Order at Price 95, Qty 10 to a Sell Orders Node.

| Price: 95 Qty: 5 | Price: 95 Qty: 7 | Price: 95 Qty: 13 | Price: 95 Qty: 88 | Price: 98 Qty: 27 | Price 98 Qty: 45 |

The lowest priority order before appending gets "pushed back" along with its bit value. (compare with FIG. 13)

Highest-Priority Bitmask: 010001

Lowest-Priority Bitmask: 101000

Previous State

| Price: 95 Qty: 5 | Price: 95 Qty: 7 | Price: 95 Qty: 13 | Price: 95 Qty: 88 | Price: 95 Qty: 10 | Price 98 Qty: 27 |

The last bit "1" has been pushed back to a succeeding node, with its corresponding order.

Highest-Priority Bitmask: 100001

Lowest-Priority Bitmask: 010000

Post-Processing State

FIG 19

*Prepending a Sell Order at Price 95, Qty 10 to a Sell Orders Node.

| Price: 93 Qty: 5 | Price: 95 Qty: 7 | Price: 95 Qty: 13 | Price: 95 Qty: 88 | Price: 98 Qty: 27 | Price 98 Qty: 45 |
|---|---|---|---|---|---|

The highest priority order before prepending gets "pushed forward". (compare with FIG. 14)

| Highest-Priority Bitmask: 010011 | Lowest-Priority Bitmask: 101001 |
|---|---|

Previous State

| Price: 95 Qty: 10 | Price: 95 Qty: 7 | Price: 95 Qty: 13 | Price: 95 Qty: 88 | Price: 98 Qty: 27 | Price 98 Qty: 45 |
|---|---|---|---|---|---|

The first bit of Highest-Priority Bitmask now corresponds to the highest-priority order of price level 95.

The first bit of Lowest-Priority Bitmask has been pushed forward to a preceding node.

| Highest-Priority Bitmask: 010001 | Lowest-Priority Bitmask: 101000 |
|---|---|

Post-Processing State

FIG 20

ENHANCED ULTRA LOW-LATENCY, HIGH-THROUGHPUT MATCHING ENGINE FOR ELECTRONIC TRADING SYSTEMS

CROSS-REFERENCE TO RELATED APPLICATIONS

This application is a continuation-in-part of U.S. Non-Provisional application Ser. No. 19/080,927, filed Mar. 16, 2025, the entire disclosure of which is incorporated herein by reference.

FIELD OF THE INVENTION

This invention relates to electronic trading systems and, more specifically, to a high-speed matching engine designed for processing large volumes of trade orders with ultra-low latency. The invention addresses the significant challenges of order congestion and unpredictable latency spikes caused by micro-bursts in modern financial markets.

BACKGROUND OF THE INVENTION AND PRIOR ART

Modern electronic trading platforms rely on matching engines to rapidly pair buy and sell orders and execute trades. These systems must maintain predictable low latency to ensure fair market operations and mitigate financial risks associated with execution delays. However, traditional matching engines are often overwhelmed by micro-bursts-short, intense spikes in order flow generated by advanced high-frequency trading algorithms. Such bursts temporarily exceed the processing capacity of conventional systems, leading to increased latency, wider bid-ask spreads, and reduced order book depth. Relevant studies, such as Aquilina et al. indicate that nearly 20% of transactions occur during these micro-bursts across the major exchanges, which adversely affects market makers, liquidity providers, and overall market quality. This problem has been exacerbated by the advent of sophisticated Artificial Intelligence based trading bots and ever-growing computational resources.

Existing solutions—including intentional speed bumps, periodic batch auctions, randomized order processing delays, and delayed market data dissemination—have been introduced to mitigate the effects of micro-bursts. However, these measures have failed to resolve the underlying throughput limitations of current matching engines. For instance, in 2017, NYSE American implemented a 350-microsecond "speed bump" designed to allow market makers sufficient time to update their quotes before high-frequency trading bots could exploit stale quotes. The measure, however, resulted in wider spreads (+40%), lower trading volume (−8%), and reduced market share, ultimately prompting its removal in 2019.

The core matching process is designed to operate in a single-threaded mode for each symbol, ensuring strict enforcement of order time priority. While it is technically feasible to run multiple order books concurrently for the same symbol, merging different symbols into one order book is not advisable because each symbol represents a distinct asset. According to Amdahl's law, the portion of work that cannot be parallelized becomes the bottleneck, regardless of how many computational resources are available. Consequently, the overall throughput of the matching engine is ultimately limited by the latency of the core match process, since the core match throughput is essentially the inverse of its processing latency.

Summary of the Problem

The core issue with prior art matching engine technologies is its inability to efficiently scale throughput during periods of extreme order flow. One of the world's largest exchanges, such as Deutsche Börse group's Eurex, typically achieve a throughput of about 200,000 orders per second per symbol based on their July 2024 technical publication. During micro-bursts, however, the surge in order volume far exceeds this capacity, leading to severe latency spikes. This limitation forces market makers to adopt more defensive quoting strategies, since they are unable to quickly change the quote due to the overwhelmed matching engine and thus their orders being sniped by "faster" opportunistic high-frequency trading bots, which increases bid-ask spread and ultimately reduces revenue for exchanges.

SUMMARY OF THE INVENTION

The present invention overcomes prior-art matching engine limitations through an integrated approach combining cache-oriented memory architecture, slot-based order book data structures, and hardware-aware data-movement routines. In one C++ embodiment, a single 4.0 GHz CPU core processes up to 12.5 million orders per second (which corresponds to 30 million total order-related messages) on commodity hardware, utilizing core-local memory pools that allocate large, contiguous pages configurable to match anticipated order volume and minimize TLB misses without wasting memory on lightly loaded cores.

Inside every pool, pre-constructed Data Holder Nodes store orders in cache-line-aligned, fixed-capacity arrays. Two alternative reference schemes are supported: (i) a single or dual-bitmask abstraction that flags the tail- or/and head-of-queue slots with single-cycle, branch-free bit-shifts, and (ii) an embedded-pointer layout that dereferences the Price Level Descriptor directly from each order object when constant-time access eclipses footprint. A platform-specific SIMD_COPY kernel moves entire 64-byte cache lines per instruction (AVX-512, AVX2, NEON, or SVE fallback), and optional non-temporal writes keep the match core's cache pristine.

Price levels are indexed by a balanced search tree that guarantees O(log N) ceiling/floor look-ups; an auxiliary closed-hash map can be enabled per symbol to provide O(1) existence checks when micro-burst latency dominates memory footprint. Crucially, each Data Holder Node's maximum capacity is a monotone, depth-aware function-large, "fat" nodes near the book head amortize shifts, while slimmer nodes deeper in the book shrink processor cache pressure. A lightweight online machine-learning controller re-estimates cache-hit probabilities every few milliseconds and retunes both node sizes and cascade limits without interrupting trading.

Push Back and Push Forward cascades relocate surplus orders between adjacent nodes during insertion or prepending operations, ensuring each node remains densely populated. Cascade depth and node capacity are tunable parameters that can be adjusted empirically for specific cache sizes and memory bandwidth to achieve optimal throughput-latency balance.

The synergy of per-core huge-page pools, slot-indexed nodes, dual tree+hash look-ups, depth-aware sizing, cascade-balanced storage, SIMD-accelerated data movement, and live ML tuning delivers deterministic sub-microsecond latency during the harshest micro-burst events, yet remains portable across x86-64, Arm, and other architectures. Exchanges deploying the invention can tighten spreads, boost match-rate revenue, and satisfy stringent regulatory latency caps—all with off-the-shelf silicon and priority-compliant processors.

BRIEF DESCRIPTION OF DRAWINGS

The present invention is described in detail through non-limiting examples with reference to the accompanying drawings.

FIG. 2 is a high-level diagram illustrating Data Holder Nodes, which store orders and Price Level Pointers, along with the relevant operations performed on them.

FIG. 10 is an illustration of a procedural overview of order execution within a Data Holder Node.

FIG. 11 is an illustration of the Append operation within a Data Holder Node.

FIG. 12 is an illustration of the Prepend operation within a Data Holder Node.

FIG. 13 is an illustration of the Push Back operation within a Data Holder Node.

FIG. 14 is an illustration of the Push Forward operation within a Data Holder Node.

FIG. 16 is an illustration of a procedural overview of order execution with bitmask abstraction.

FIG. 17 is an illustration of the Append operation with bitmask abstraction.

FIG. 18 is an illustration of the Prepend operation with bitmask abstraction.

FIG. 19 is an illustration of the Push Back operation with bitmask abstraction.

FIG. 20 is an illustration of the Push Forward operation with bitmask abstraction.

BEST MODE FOR CARRYING OUT THE INVENTION

The present best mode for implementing this invention involves using a low-level language such as C or C++, which allows direct memory control. When used with a garbage-collected language, the user must disable the garbage collector to prevent any interferences from the garbage collector. For optimal data movement, the hardware should support at least 128-bit SIMD instructions, with 256-bit or 512-bit instructions being ideal. A major source of processing latency arises from storing each incoming order's unique identifier in a hash map, so the choice of hash map should match the hardware architecture. A linear, closed-hashing approach is generally recommended.

DETAILED DESCRIPTION

The present continuation-in-part adds or expands the following subject matter relative to U.S. application Ser. No. 19/080,927 (filed 16 Mar. 2025):

(a) additional implementation detail for the optional dual-lookup path that combines a balanced price-level tree with an auxiliary hash map (the basic concept is disclosed in the parent application); and (b) additional implementation detail for SIMD-based prefetch algorithms used for in-node realignment (the underlying approach is disclosed in the parent application); and (c) an exemplary implementation on the Linux operating system, detailing the use of sched_setaffinity( ) to pin threads to specific CPU cores, set_mempolicy( ) to bind memory to a NUMA node, and mmap( ) to allocate tailored huge-page sizes for optimizing TLB coverage and minimizing cross-core lock contention.

Except for the foregoing additions and editorial clarifications, the portions reproduced from the parent application are repeated without substantive change.

The disclosed embodiments relate to a method for constructing a high-speed matching engine by integrating the unique techniques described herein, resulting in one of the fastest known matching engine architectures to date.

Figure 1:
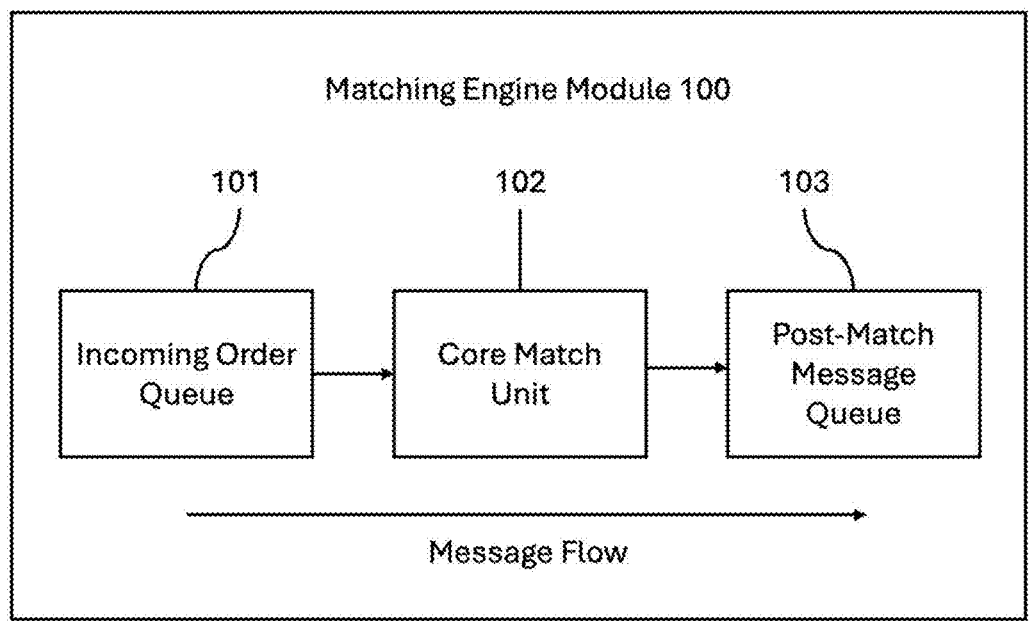
FIG. 1 is a schematic diagram illustrating a general overview of the core matching process.

As used herein, a "matching engine" refers to the matching-engine module 100 illustrated in FIG. 1. The module consists of an incoming-order queue 101, a core match unit 102, and a post-processing message queue 103 arranged sequentially so that messages flow from the order queue, through the core match unit, to the message queue.

Although these three modules can be combined in various ways, one exemplary embodiment employs a Single-Producer, Single-Consumer (SPSC) queue for both the incoming order queue 101 and the post-processing message queue 103, leveraging the fact that the core match unit 102 is inherently single-threaded for each distinct ticker symbol. Alternatively, if an exchange's gateway requirements dictate, the incoming order queue 101 may be configured as a Multi-Producer, Single-Consumer (MPSC) queue, and the post-processing message queue could be either MPSC or Multi-Producer, Multi-Consumer (MPMC), depending on specific system needs. Regardless of the chosen queue type, distributing each incoming order to its corresponding core match unit 102 is most efficiently implemented with hardware-level optimizations to maximize performance.

Figure 3:
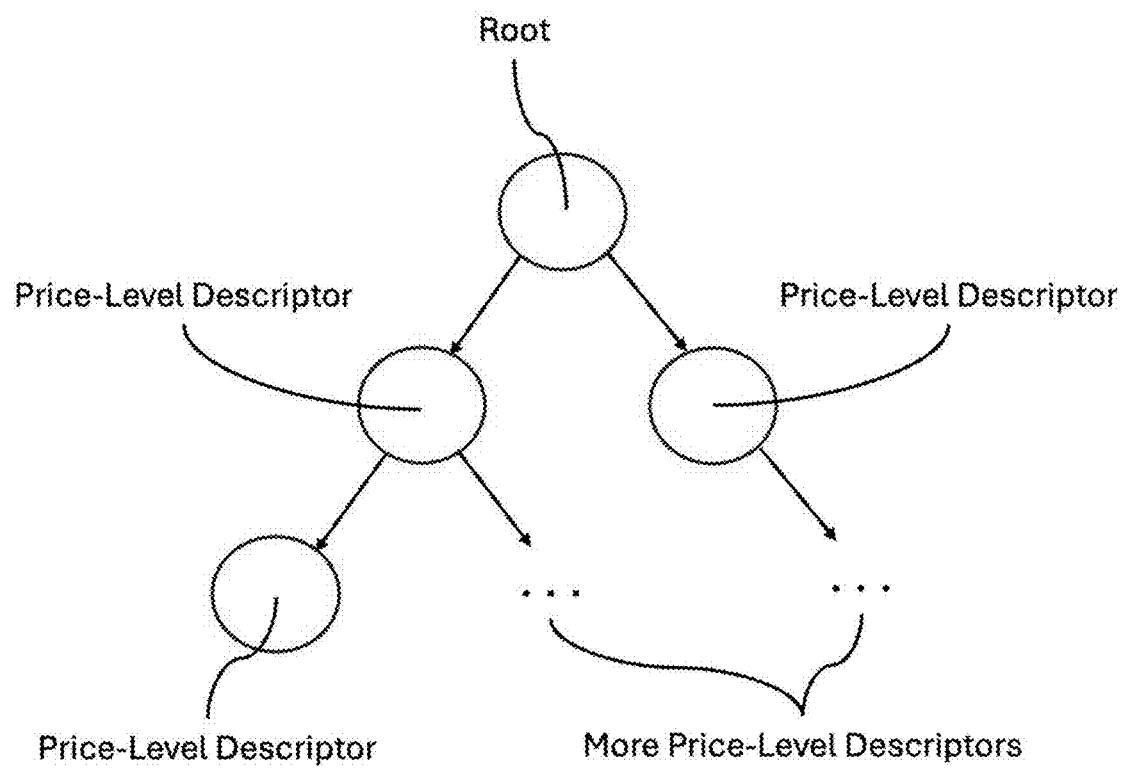
FIG. 3 is an illustration showing the alignment of Price Level Descriptors in a tree-like structure.
Figure 4:
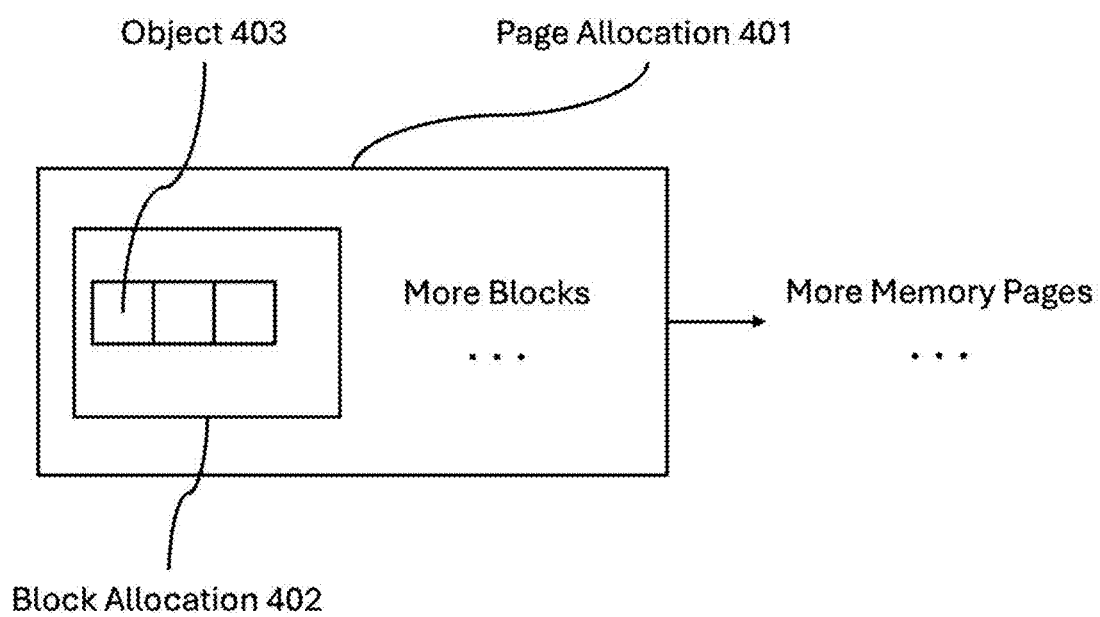
FIG. 4 is a high-level overview of the specially designed memory pool.
Figure 8:
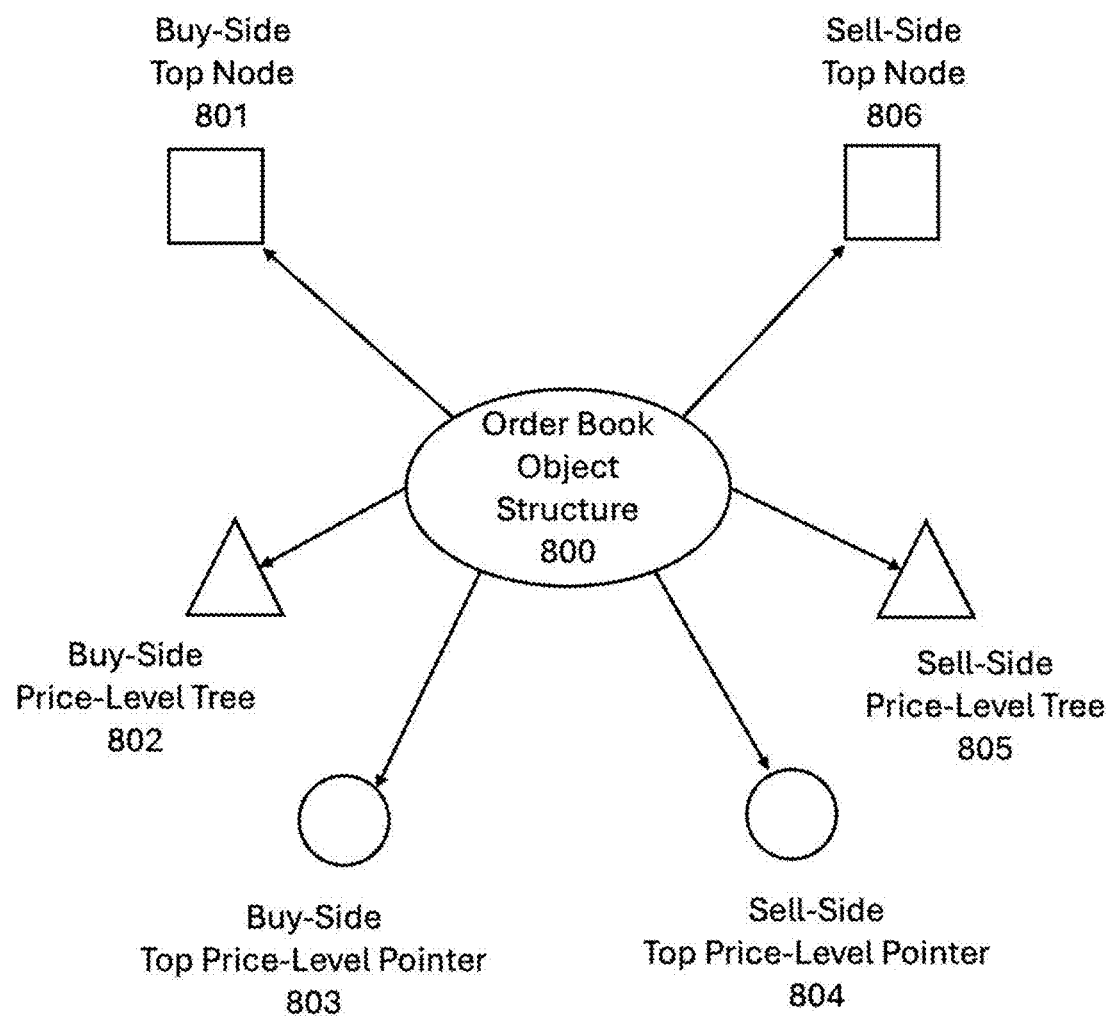
FIG. 8 is a schematic diagram showing the object structure of the order book.

Before describing the matching process in detail, it is necessary to explain the underlying data structure of the order book 800 (see FIG. 8), including the Data Holder Node 200 (see FIG. 2), the Price Level Descriptor (see FIG. 3), and the memory pool (see FIG. 4).

Referring to FIG. 2, the Data Holder Node 200 comprises three principal regions: a contiguous block of memory for storing orders 201, an area containing Price Level Pointers 202 that reference associated Price Level Descriptors, and a metadata section 203. The metadata typically includes fast-lookup information, such as the current count of orders within the node. In this exemplary embodiment, nodes are doubly linked for ease of traversal; however, a singly linked arrangement could be employed if desired, at the cost of greater implementation complexity. A defining advantage of the Data Holder Node 200 over conventional, linked-list-based approaches is its use of a fixed-capacity block of memory that can hold orders with differing prices in contiguous storage. Traditional designs typically store an unbounded list of orders at a single price level, necessitating pointer dereferences for each insertion, deletion, or lookup. By contrast, the contiguous memory layout in the Data Holder Node 200 provides direct indexing of orders without per-order pointer dereferences, thereby significantly reducing latency and improving cache efficiency.

Figure 9:
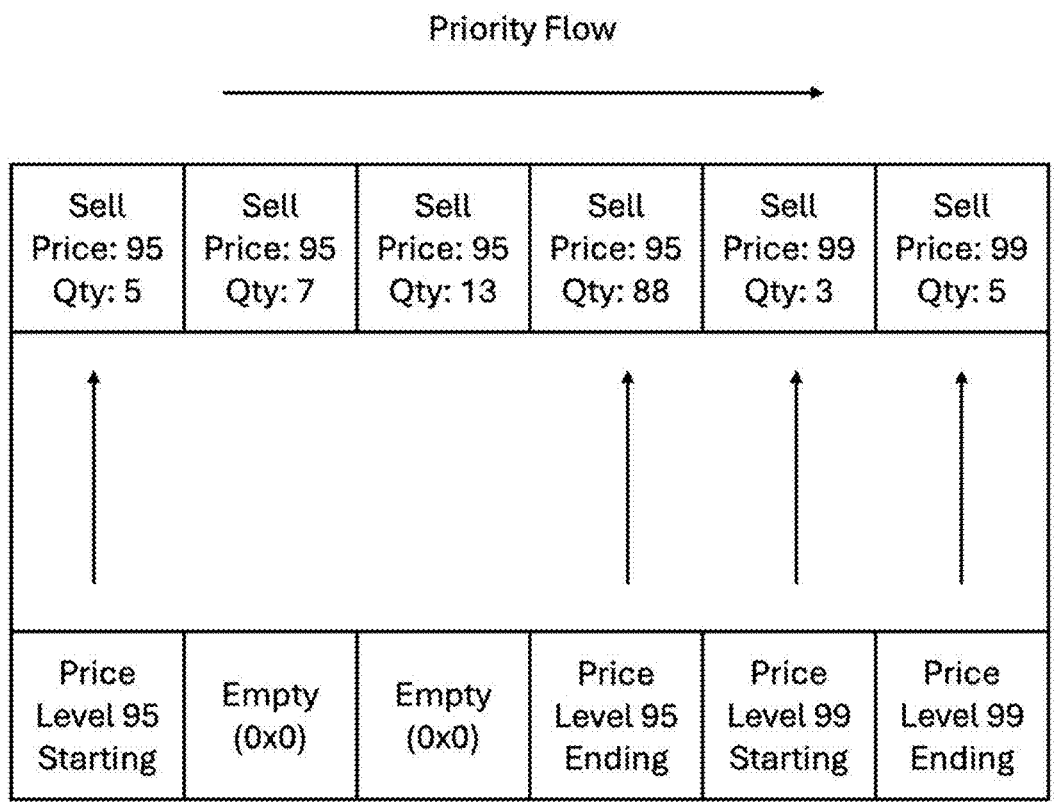
FIG. 9 is an illustration depicting the relationship between orders and Price Level Pointers within a Data Holder Node.
Figure 15:
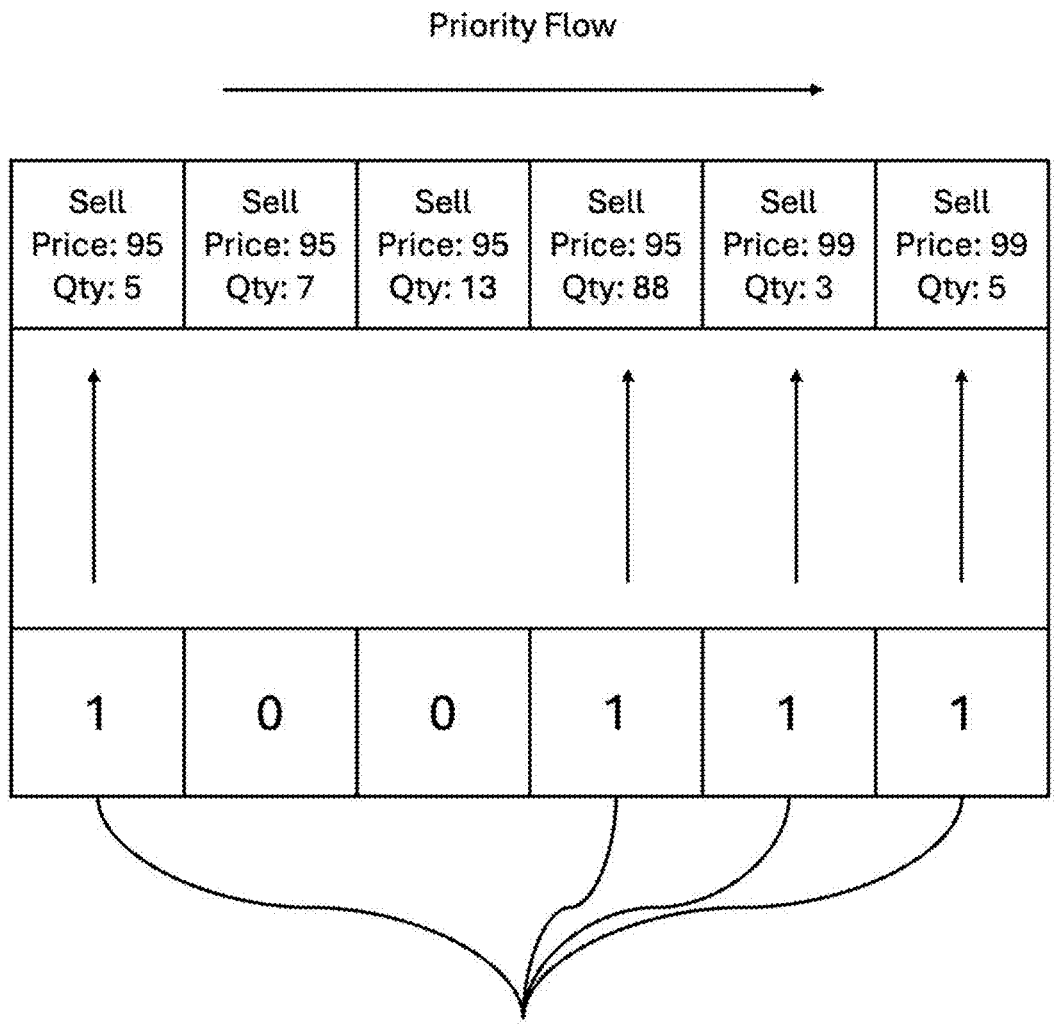
FIG. 15 is an illustration depicting the relationship between orders and bit-values in a bitmask within a Data Holder Node.

Continuing with the Data Holder Node, orders 201 are stored as objects directly within the node's contiguous section rather than as pointers. By contrast, the Price Level Pointers 202 are stored solely as references to externally allocated Price Level Descriptor objects, typically implemented as pointers to those objects. The node itself does not embed the actual Price Level Descriptor objects, which are allocated and maintained separately-often in a dedicated memory pool. This design choice reduces memory overhead within the Data Holder Node and preserves stable references to the Price Level Descriptors, a critical requirement for building the tree structure described in [0052]. In this exemplary embodiment, each price level uses two pointers-one for the highest-priority order (start) and one for the lowest-priority order (end), as shown in FIG. 9. An alternative configuration includes only an end pointer, reducing complexity but limiting certain functionalities (e.g., jumping to the front of the queue).

Because a single order can represent both the highest and lowest priority if it is the only order at its price level, each order may occupy two pointer slots in the Price Level Pointer holder 202. Thus, when both highest- and lowest-priority pointers are employed, the number of pointer slots can be twice the number of order slots 201. Conversely, if only the lowest-priority pointer is used, the pointer slots match the number of order slots.

When multiple orders occupy the same price level, the container that stores the Price Level Pointers has unused slots between the highest-priority and lowest-priority orders (see FIG. 9). Each pointer resides in a fixed slot inside the Data Holder Node's internal array. Whenever an execution, insertion, or cancellation changes the order sequence, the orders are reordered by priority and the pointers move with their slots, ensuring that every pointer continuously references the correct order (see FIG. 10). For example, if the current highest-priority order is removed, the pointer in the "highest" slot now references the next-highest order, while the "lowest" pointer is updated if a new order is appended at the back.

To move bulk data efficiently, the system invokes a platform-specific routine referred to herein as SIMD_COPY. All memory regions handled by this routine-including the contiguous order blocks inside each Data Holder Node and the ring-buffer elements used by the incoming-order and post-processing message queues—are allocated on 64-byte boundaries, enabling an entire cache line to be transferred with a single instruction. When the processor supports AVX-512, SIMD_COPY issues 512-bit loads and stores and therefore moves 64 bytes per SIMD_COPY instruction; if AVX-512 is unavailable, it falls back to AVX2 (256-bit) or to whichever vector width the hardware provides, ultimately defaulting to a standard memory-copy operation when SIMD is not present. By treating each movable object as a trivially copyable, cache-line-sized chunk, the routine accelerates both intra-node order realignment and inter-thread message transport while remaining portable across architectures.

In addition to moving bulk data, the system also shifts pointer values-often 8 bytes eachbetween nodes or within the same node. Because these pointer updates are comparatively small (normally, one 64-bit words), they remain very fast even if SIMD instructions are not used. In particular, aligning these pointer slots to at least 8-byte boundaries ensures minimal overhead during pointer swaps or adjustments. This is critical when reassigning Price Level Pointers, updating doubly linked lists, or performing other pointer-based operations (e.g., re-linking nodes after an order is canceled or executed). By carefully managing both large data moves with SIMD and pointer realignments, the system maintains high throughput while minimizing latency throughout the matching process.

As part of the cache-warming strategy, the system provides a storage-realignment function that shifts orders inside a Data Holder Node to create contiguous free space for new inserts. The function first validates the target insert position in the order slot and the current order count, then selects an optimal movement strategy based on the number of slots to shift and the hardware's cache-line size. By prefetching entire cache lines of the order slots and the Price Level Pointer slots, and performing the shift in SIMD-sized blocks, the routine minimizes cache misses and guarantees that subsequent Append and Prepend operations (as later described in [0048]) execute without additional realignment overhead.

Depending on the ratio of cache line size to order size, the function selects different code paths using compile-time conditions (e.g., C++'s constexpr if). It aligns prefetching to cache line boundaries and shifts orders in blocks via SIMD-based operations. Prefetching is executed in write mode and directed to the L1 cache to ensure immediate data availability and maximize performance.

After shifting the order data, the function updates an associated pointer array using a safe memory move operation (e.g. std::memmove in C++) to preserve the relationship between orders and their metadata. An assertion then confirms that each pointer correctly corresponds to its order's price, ensuring data integrity. Overall, this function exemplifies a sophisticated cache-warming technique that combines hardware-aware prefetching, SIMD-optimized data movement, and precise pointer management to achieve high performance in a data-intensive trading environment.

The Data Holder Node supports two primary operations: Append and Prepend. Append adds an incoming order at the ending Price Level Pointer (see FIG. 11), effectively placing the new order at the end of the existing priority chain for that price level. In doing so, the ending pointer shifts its corresponding relationship to the newly appended order. In this exemplary embodiment, appending at the starting pointer location is disallowed to avoid potential errors, though an exchange may opt to enable it if needed. By contrast, Prepend places an incoming order in front of the starting Price Level Pointer, shifting that pointer to the newly prepended order and modifying the overall priority chain (see FIG. 12). This approach is particularly relevant when the order's priority exceeds that of the current top-level order-such as a newly arrived lowest ask at Sell Orders Node, or if a "jump to the front" mechanism is required to override priority.

In addition to Append and Prepend, the Data Holder Node offers two derivative mechanisms-Push Back (204) and Push Forward (205)—to maintain an orderly state across multiple nodes (see FIG. 2, FIG. 13, and FIG. 14). For example, if the system tries to append an order to a node that is already full, an existing order-along with its Price Level Pointer (or a null pointer if none is assigned)—may be pushed back to the next node (see FIG. 13). The system decides which order to move by comparing the priority of the node's last order with that of the incoming order. Once pushed back, the displaced order is treated as a newly prepended order in the succeeding node, and the system processes it accordingly.

If the succeeding node is also at capacity, the Push Back operation may cascade further as the least-priority order in that node and its corresponding Price Level Pointer (if any) will in turn be pushed back to the next succeeding node. If a Push Back occurs and no succeeding node exists, a new Data Holder Node is assigned from the memory pool to accommodate the pushed-back order and its corresponding Price Level Pointer. In practice, a small cascade limit—for example, five nodes-maintains predictable latency; the optimal threshold, however, is chosen empirically for a given system's cache size and memory bandwidth. Increasing the limit tends to keep nodes densely populated, thereby improving cache locality, but it also adds processing overhead to each insertion. Accordingly, both node capacity and cascade depth are tunable parameters that an implementer can adjust to balance throughput and latency on the target architecture.

Push Forward is the symmetrical operation invoked when Prepend occurs on a full node (FIG. 14). The system decides which order to move by comparing the priority of the node's first-slot order (slot 0) with that of the incoming order. Then, the algorithm relocates the chosen order—and its associated Price Level Pointer (if any)—to the preceding node, where it is treated as a newly appended order in that node. If the preceding node is also full, the cascade continues toward the head of the order book, assigning a new Data Holder Node from the memory pool when necessary. Limiting the cascade depth to a modest, empirically determined value helps preserve deterministic performance across different hardware configurations.

A Price Level Descriptor includes a metadata section containing the price level itself, the total quantity at that level, and one or more pointers to the Data Holder Node that currently holds either the highest-priority or lowest-priority order of its price level (depending on the pointer's role). Additionally, the Price Level Descriptor is organized as a tree structure (see FIG. 3) to achieve O(log n) lookups when searching for the nearest available price. While this exemplary embodiment uses a red-black tree implementation, any balanced tree (e.g., AVL tree) is viable, provided it supports O(log n) searching for the closest price. It should be noted that AVL trees often require more frequent rebalancing, which can introduce additional overhead compared to red-black trees. Therefore, the choice of tree structure depends on the exchange's performance requirements and tolerance for rebalancing costs. The trees are constructed on each side of the order book (Buy and Sell) and their roots 802 and 805 are encapsulated in the Order Book object structure 800. (see FIG. 8) As part of its cache warming strategy, this exemplary embodiment preloads the tree's traversal path into the L3 cache, enabling efficient read access for subsequent lookups.

As illustrated in FIG. 4, the invention introduces a memory pool that allocates memory in large contiguous pages-typically 2 MB, but configurable to 1 GB or any hardware-supported huge page sizes, whenever the host operating system and processor support those huge pages. These pages are obtained according to the system's huge-page configuration, ensuring optimal memory management and performance. Within each allocated page, the memory is subdivided into fixed-size blocks (402) that store multiple objects of a predetermined type.

Each block is designed to hold a specific number of objects, and its structure is optimized to minimize memory fragmentation and maximize cache locality. The custom block allocator is responsible for mapping and unmapping these large pages. When a block becomes fully occupied, it is removed from the free list; conversely, if a block becomes entirely empty, its parent page is unmapped and returned to the operating system.

One of the key differentiators of this memory pool is that the objects are preconstructed within each block at the time of block allocation. Rather than constructing a new object on each assignment request, the pool simply returns a pointer to an already constructed object within the pre-allocated block. This eliminates the runtime overhead of object construction, thereby speeding up the allocation process significantly-a crucial advantage in environments where every nanosecond counts.

Within each block of this exemplary embodiment, free slots are tracked using an array that is directly allocated as part of the block's memory rather than being allocated in another heap memory space (e.g. std::vector in C++). This design choice avoids the need for additional pointer dereferences, which can add latency. When an object is released, its slot index is returned to this array, ensuring that free slots are efficiently managed and immediately available for reuse. This method of in-block free slot management helps maintain a high level of cache efficiency, as all relevant data remains in a contiguous memory region.

By basing page allocations on the system's huge page configuration-2 MB, 1 GB, or any hardware-supported huge page sizes—the memory pool is highly adaptable to various hardware environments. Large page allocations reduce the frequency of TLB misses and improve memory bandwidth, which is essential for the performance of data-intensive applications like matching engines. The combination of preconstructed objects, efficient block-level management, and in-block free-slot tracking creates a scalable, low-latency memory management system that sets this invention apart from conventional memory allocators.

In one embodiment, each memory pool object is core-specific, rather than shared among multiple processor cores. This design choice avoids the overhead of implementing thread-safe concurrency within the memory pool itself, thereby reducing latency for high-throughput operations. However, it may result in higher overall memory usage if certain cores process fewer orders than others-some pools may remain underutilized while others are at capacity. To address this imbalance, each pool can request a page size tailored to its core's anticipated order volume: for example, 1 GB or larger huge pages (e.g., 2 GB) for the busiest cores, 2 MB pages for typical traffic, or the standard 4 KB page size when order flow is light. Most modern operating systems support multiple huge-page sizes concurrently, so per-core page sizing lets the exchange minimize waste while preserving the latency benefits of core-local, lock-free memory pools. In an exemplary Linux implementation, the engine pins each core-match thread to its dedicated CPU with sched_setaffinity( ), binds the thread's memory policy to the corresponding NUMA node via set_mempolicy( ), and calls mmap( ) with the appropriate flags. Because the kernel maintains separate pools for every huge-page size, a heavily loaded core can request 1 GB or larger pages while a lightly loaded core maps only 2 MB or 4 KB pages, thereby tailoring TLB coverage to real-time demand without sacrificing core-locality or incurring cross-core locks.

Figure 6:
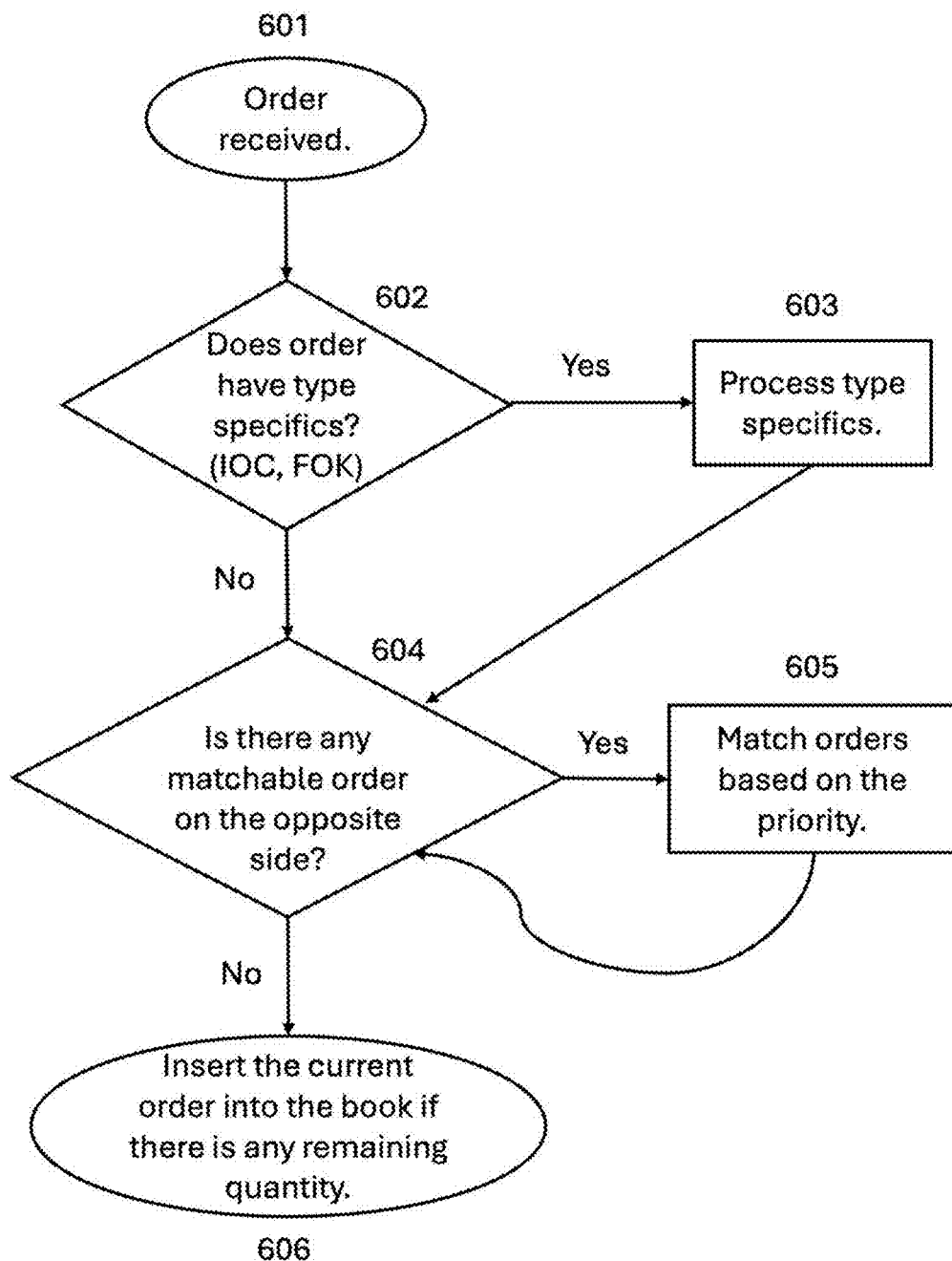
FIG. 6 is a flowchart outlining the matching process between an incoming order and existing orders in the order book.

The following section describes the algorithms employed by the core match unit 102. Referring to FIG. 6, the processing logic flow for the core matching process is illustrated. When an order arrives (601), the system immediately sends an order acknowledgment to the post-processing message queue 103. Next, it processes any special-order designations associated with the incoming order (602). Examples of such designations (603) include Immediate-Or-Cancel (IOC) and Fill-Or-Kill (FOK), as defined by the exchange's rulebook and supported order types. The system then checks for any matchable order on the opposite side (604). In this exemplary embodiment, the presence of a matchable order is confirmed by determining whether the top priority Price Level Pointer on the opposite side is active. Because the order book structure 800 maintains the references to the highest-priority (lowest ask and highest bid) Price Level Descriptors for both sides (803 and 804), the relevant pointer address is often stored in the processor's register, making the lookup operation extremely fast. Although the system could also inspect the top nodes (801, 806), it is preferable to avoid reading the underlying memory content to reduce latency. Instead, checking only whether the pointer address is null suffices to confirm availability.

Once a matchable order is identified, the system enters an iterative process to execute orders based on their priority (605). Depending on the exchange's requirements, the matching algorithm may employ a FIFO (first-in, first-out) approach, a pro-rata method, or a hybrid of these techniques to ensure orders are executed according to the prescribed priority rules. For each match, a trade signal is emitted to the post-processing message queue 103. If a price level is exhausted (i.e., no remaining orders at that level), the corresponding Price Level Descriptor is released to the memory pool. Similarly, if all orders in a Data Holder Node are depleted, that node is also returned to the pool. This prompt release of unused resources ensures high performance and efficient memory utilization throughout the matching process. Once no further orders can be matched, the system proceeds to the order insertion process (701) if any remaining quantity exists on the incoming order; otherwise, it exits the process.

Figure 7:
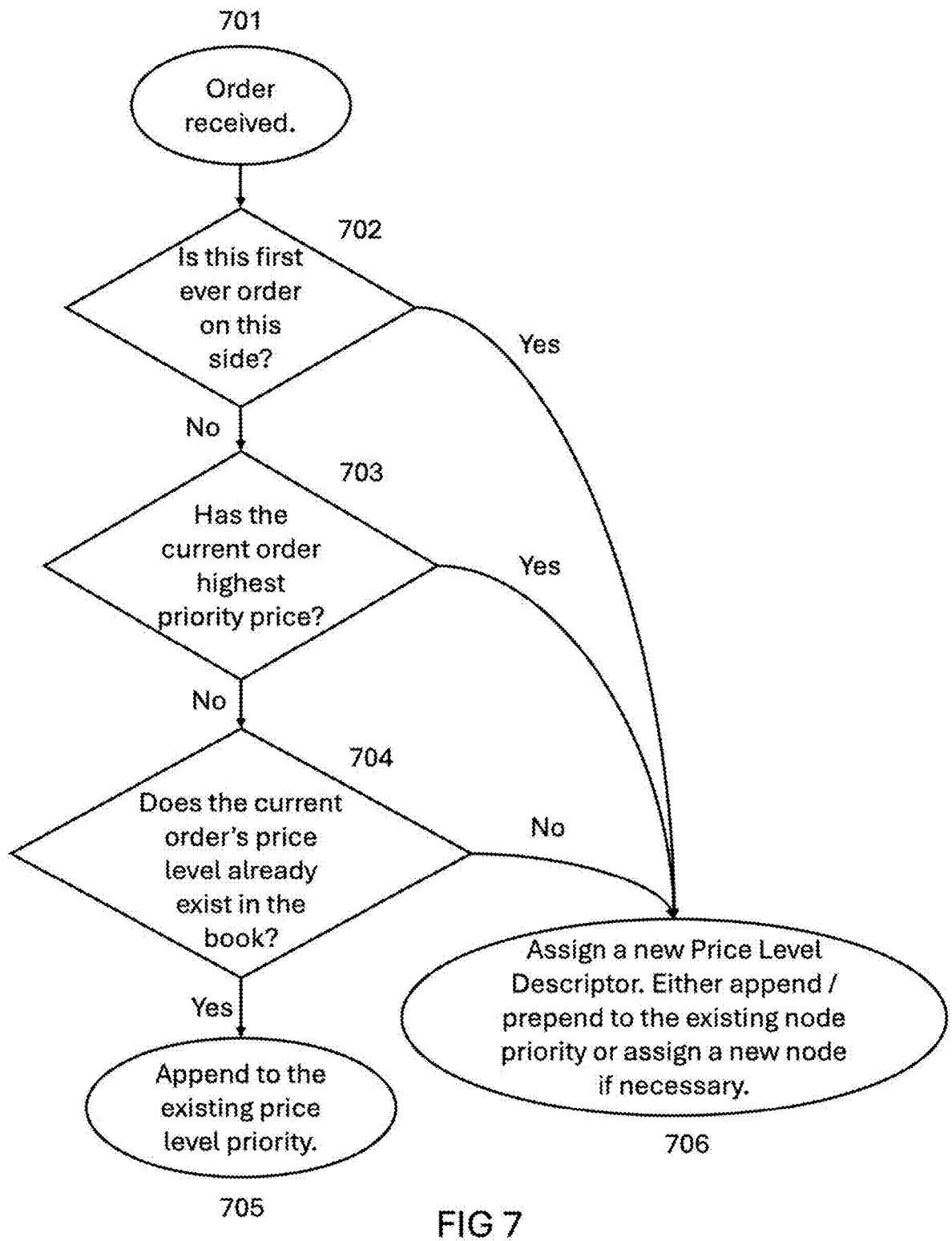
FIG. 7 is a flowchart illustrating the process of inserting an incoming order into the order book.

FIG. 7 outlines the order-insertion process. At step 701 the system determines whether the incoming order's price level already exists in the order book. Two alternative lookup paths are available, and the exchange may enable either or both at configuration time:
 (a) Baseline path—Tree lookup: The system performs an O(log n) search in the balanced Price Level Descriptor tree;
 (b) Optional path—Auxiliary hash map: If enabled, the system first performs an O(1) lookup in a hash map keyed by price level and consults the tree only when the hash result is null. Using either configuration (tree-only or dual tree-plus-hash map), once a price level is found, the system appends the order to that level. If the price level is absent, control passes to the special case flows in steps 702 and 703. In alternative embodiments, the processing order of steps 702, 703, and 704 may be rearranged to address these cases more efficiently on a given hardware platform. The optional hash map trades a modest increase in memory for predictable constant-time existence checks on heavily traded symbols. However, the performance improvement must be measured on the specific system to justify the added complexity.

Case 702 (First Ever Order): This situation arises when the book is empty on the given side (e.g., Buy or Sell). It always involves creating a new Data Holder Node since there are no existing nodes for that side. Because this scenario is relatively rare, the implementation can optimize branch prediction accordingly.

Case 703 (New Highest Priority): If the incoming order's price resets the highest-priority level (lowest ask or highest bid), the system performs Prepend rather than Append. It locates the current highest Price Level Pointer and accesses the corresponding Data Holder Node to place the new order at the front. In some instances, no new Data Holder Node is assigned from the memory pool here-only the prepending operation on the existing node for the current highest priority.

For orders whose price level is not present in the book and is not the highest priority, the system locates the appropriate insertion point by performing a Ceiling operation (for Buy orders) or a Floor operation (for Sell orders) on the existing price levels. Once the next higher-priority price level is identified, the system appends the order to the end of that level's order list. Whenever a new Price Level Descriptor is assigned—whether in Case 702, Case 703, or this general insertion path—the system:
 (a) places the descriptor in the Price Level Descriptor tree (see FIG. 8, elements 802 or 805) to preserve O(log n) ordering and;
 (b) writes an entry to the auxiliary hash map (if present) so that future existence checks can execute in O(1) time. Likewise, when a price level is exhausted, its descriptor is removed from both the tree and, if applicable, the hash map. This synchronized maintenance ensures that the two data structures remain consistent while allowing the exchange to select the latency-memory trade-off that best fits each trading symbol.

In every order insertion process, the system registers the Data Holder Node address for the incoming order in a hash map, ensuring O(1) lookups. This mapping is crucial for subsequent operations-such as order cancellation and order modification-because it enables the system to quickly locate and update the relevant order. Similarly, this logic applies to Push Back (204) and Push Forward (205) operations, because once an order is moved to a different Data Holder Node, the hash map must be updated to reflect the new node address for accurate future lookups. For hash map selection, we suggest using a custom closed-hashing design with SIMD-optimized lookups that generally delivers superior performance.

For order cancellation, the system retrieves the Data Holder Node pointer by using the order's unique identifier as a key in the hash map, then proceeds to cancel the order. At the Data Holder Node level, this cancellation process mirrors order execution: the specified order is removed, and if it was the highest or lowest priority at that price level, the corresponding Price Level Pointer is also deleted or adjusted. The remaining orders in the node are then rearranged to reflect their updated priorities. Finally, once the order is successfully canceled, a signal is emitted through the post-processing message queue 103.

Order modification is implemented using a two-tiered approach. First, the system locates the Data Holder Node containing the order by looking up the order's unique identifier in the hash map. If only the order quantity has changed, the system simply finds the order's location within the node and updates the quantity accordingly. However, if the order's price has changed, the system cancels the existing order (as described in [0066]) and treats the change as a new insertion at the revised price level. This approach is necessary because altering an order's price across the execution barrier—the best price on the opposite side—may trigger executions in the order book, or at least it changes the priority of the order if reinserted at different price level. As with order cancellation, a successful order modification results in the emission of a signal via the post-processing message queue 103.

As part of the data transport mechanism (elements 101 and 103), one embodiment implements a high-performance, single-producer/single-consumer queue with a strong focus on cache warming to reduce latency and improve throughput. All key member variables-including the atomic indices for writing and reading, as well as the ring-buffer storing the queue elements—are explicitly aligned to the hardware's cache line size. This alignment minimizes cache line contention and eliminates false sharing.

Within the queue's "emplace" method, the queue uses atomic operations to safely insert new elements into the buffer. The method computes the next write index based on a bitmask and uses a loop to ensure that the producer does not overwrite unread data by comparing against a locally cached read index. By updating these indices using memory order-relaxed and memory order-release semantics, the implementation ensures efficient synchronization between the producer and consumer without incurring unnecessary overhead.

Figure 5:
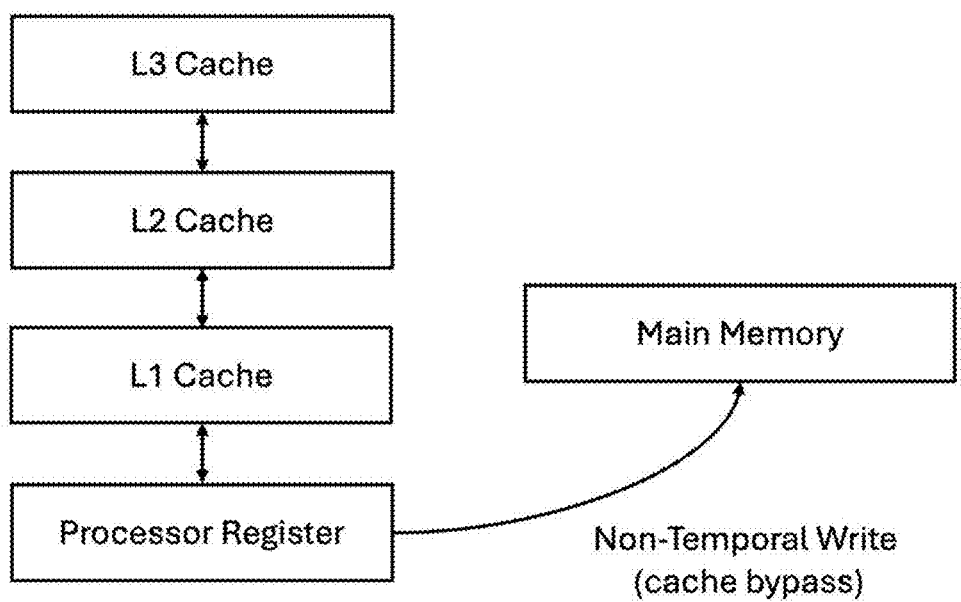
FIG. 5 is a schematic of a conventional computer-memory hierarchy (context diagram).

As shown in FIG. 5, the implementation can optionally use non-temporal write operations during the "emplace" procedure to reduce cache pollution on the processor running core match unit 102. Because the post-processing messages are already known to the core match unit (the writer), retaining these messages in the writer's cache is unnecessary after they have been written. While this non-temporal approach might introduce a slight latency increase for the thread reading those messages, it can further enhance the throughput of core match unit 102. However, the performance benefits must be experimentally determined for each specific hardware configuration, as they may vary significantly based on several factors including:

(a) NUMA (Non-Uniform Memory Access) relationships between the processor running the core match unit 102 and the processors managing message queues (101, 103)

(b) Cache hierarchy and sharing patterns of the target architecture (c) Memory controller bandwidth and latency characteristics (d) Workload-specific access patterns and message sizes The "pop" method of the queue further exemplifies the cache-warming strategy by having a local flag that checks whether the next data is immediately available to read in its L1 cache. Only if the next element is not immediately available and there are multiple messages left to read, the prefetcher proceeds to fetch the next information and set the "available to read" flags. The actual transfer of the data is accomplished via a SIMD-optimized copying function (referred herein as SIMD_COPY), which further accelerates the data movement by leveraging vectorized instructions that move entire objects in a single operation.

In this continuation, the following major concepts are discussed:

(a) A bit-mask abstraction that encodes the presence of Price Level Pointers with one bit per order slot, eliminating pointer relocation.

(b) Exemplary bitmask update logic, as well as the mathematical reasoning that corroborates why they are optimal.

(c) Flexible Data Holder Node capacity as well as exemplary mathematical methods for determining the optimal node capacity.

(d) Machine Learning based parameter optimization as well as exemplary implementations for on-the-fly parameter optimization.

In one embodiment the presence or absence of each Price Level Pointer in a Data Holder Node can be abstracted with a single bitmask, rather than an actual presence in a slot of Price Level Pointers. This abstraction encodes pointer presence in a bitmask, so the engine updates a single integer flag instead of physically relocating pointers. Eliminating relocation removes memcpy-style moves and their attendant memory latency. It also deletes the dedicated Price Level Pointer slot, shrinking each Data Holder Node by one machine word-typically eight bytes on an LP64 system—for every order slot, yielding a total size reduction of (pointer size×maximum orders per node) bytes. The smaller node packs more nodes per page, thereby boosting spatial locality and lowering translation-lookaside-buffer pressure. Each slot in the node maps to one bit of an integer flag, where a bit value "1" indicates that a Price Level Pointer occupies the slot and a bit value "0" indicates that it does not. Whenever the system appends, prepends, or removes an order, it updates the mask with a bit-shift operation instead of copying or moving pointers, thereby reducing maintenance overhead.

To achieve this abstraction, an embodiment needs to make each order object embed the Price Level Pointer that corresponds to that order's price level. This embedment is feasible because an order's price remains fixed while the order is active; any price change requires removing the order from the book and reinserting it at the new price level, thereby preserving price-time priority. In most 64-bit processor systems, the embedded Price Level Pointer occupies no more than eight bytes, adding only minimal overhead to each order object. An embodiment that tracks both the highest-priority and lowest-priority Price Level Pointers either:

(a) employs two separate bitmask flags or (b) uses a single bitmask with distinct bit fields for each priority.

By contrast, an embodiment that tracks only the lowest-priority pointer uses a single bitmask sized with at least as many bits as the Data Holder Node's maximum order capacity.

Furthermore, the bit-shifting logic inside of this abstraction can easily be implemented without the need of using a branched code. Contemporary 64-bit superscalar processors expose at least two arithmetic-logic units (ALUs) per core; an ALU is the execution block that performs integer arithmetic and logic operations. A 64-bit shift retires in a single cycle, and a compiler can schedule it on an otherwise idle ALU while cache lines for surrounding order data load in parallel, yielding effectively zero added latency. Modern instruction set architectures (ISAs)—the x86-64 BMI1/BMI2 extensions (e.g., BLSR, BLSI, RORX) and Arm v8's bit-field instructions (BFI, BFC)—fuse shift-and-mask sequences into single p-ops, further reducing issue-width pressure. Consequently, bit-shifting on bitmasks executes in a branchless way, avoids mis-prediction flushes, and introduces negligible overhead to the matching-engine critical path.

On top of the above benefits, embedding a Price Level Pointer in every order object lets the matching engine reach the associated Price Level Descriptor in low-constant O(1) time with a single pointer dereference. Without this embedment the matching engine must either:
(a) traverse the price-level tree in O(log n) time or
(b) probe an auxiliary hash map (if present) in high-constant O(1) time both paths typically load additional cache lines, which inevitably causes multiple L1-cache misses and raise latency. The direct pointer dereference, by contrast, incurs at most one L1-cache miss (for the corresponding Price Level Descriptor itself) and therefore outperforms the tree and hash map approaches. This constant-time, cache-friendly access is especially valuable when cancellations or modifications require frequent updates to the aggregated quantity at a given price level.

Formal Introduction—Let a Data Holder Node with maximum order slot capacity C (typically C≤64, if the capacity exceeds 64, expand this method by using two or more bitmasks for each highest and lowest priority), such that a complete Price Level Pointer allocation state in the node fits inside two 64-bit machine words. Denote the Boolean vector space of length-C bit-vectors by $$V := \mathbb{F}_2^C, \{e_0, \ldots, e_{C-1}\}$$

the canonical basis, and recall that the Boolean ring operations are XOR for addition and AND for multiplication. In this setting every mask is both a vector in V and an idempotent element of the Boolean ring. Lastly, let the order book be a left-to-right chain of Data Holder Nodes $$N_0, N_1, \ldots, N_d, \text{capacity of each } N_k = C \leq 64.$$

(a) Local price level interval in one node—For a fixed node N write $$\pi_N: \{0, \ldots, C-1\} \to \mathbb{R}_+$$

which maps each slot index to price level that the order currently stored in that slot belongs to. If price level p occurs in N with at least one order, define the block boundaries $$\alpha_N(p) := \min\{i | \pi(i) = p\}, \omega_N(p) := \max\{i | \pi(i) = p\},$$

such that the occupied slots of level p form one contiguous run $[\alpha_N(p), \omega_N(p)]$ inside node N. A node may contain no orders of p, one run, or be completely filled with p.

(b) Global first/last-node predicates—Define $$\text{First}(p) := \min\{k | p \text{ appears in } N_k\}, \text{Last}(p) := \max\{k | p \text{ appears in } N_k\}.$$

A price level that exceeds one node's capacity simply satisfies $$\text{First}(p) < \text{Last}(p)$$

where intermediate nodes hold the middle segment of the queue.

(c) Head/tail masks inside one node N—Define two Boolean vectors $$H_N, T_N \in V, H_N = (H_0, \ldots, H_{C-1}), T_N = (T_0, \ldots, T_{C-1})$$

by the rule $$H_i = 1 \Leftrightarrow (N = N_{\text{First}(\pi_N(i))}) \wedge (i = \alpha_N(\pi_N(i))),$$

$$T_i = 1 \Leftrightarrow (N = N_{\text{Last}(\pi_N(i))}) \wedge (i = \omega_N(\pi_N(i))).$$

Thus,
   (i) every price level has at most one head bit and at most one tail bit in the entire order book;
   (ii) if an order is the sole order at its price level, the single order may carry both flags;
   (iii) interior nodes of a long queue carry no flag for that level.

(d) Admissible-mask set for the node—Define the admissible set $$S_N = \{(H_N, T_N) \in V^2 | \text{definitions}(a)-(c) \text{ hold}\}.$$

Because the flag positions are determined solely by $\pi_N$, any two masks in $S_N$ agree on every index where a flag is permitted.

(e) Closure under node-wise Boolean operations—For the current node N let $$(H, T) \in S_N$$

be the unique head/tail mask that exactly describes the present slot array of N and let $$(U_H, U_T) \in V \times V$$

be a sparse update vector produced by one of the operators in Table [0080]. By construction the update vectors toggle only those bit positions that are legally allowed to carry a flag for their price level (never more than one head and one tail slot per price level). The matching engine then may apply one of two word-size primitives:

$$(H \oplus U_H, T \oplus U_T) \to (H, T)(\text{XOR toggle}),$$

$$(H \wedge \neg U_H, T \wedge \neg U_T) \to (H, T)(\text{AND clear}).$$

Because the support of $U_H, U_T$ is restricted to the single legal slot for each flag inside N, the above operations can never create an illegal "1" for any price level; they can only erase of flip existing legal bit. Formally, $$(H, T) \in S_N \Rightarrow ((H \otimes U_H, T \oplus U_T) \in S_N \wedge (H \wedge \neg U_H, T \wedge \neg U_T) \in S_N).$$

Therefore $S_N$ is closed under component-wise AND and XOR even when a price level queue extends over many Data Holder Nodes.

(f) Composite layout—When register pressure is high or the compiler can fuse two bitmasks into a single scalar variable, an embodiment can embed the ordered pair (H,T) in a single 64-bit word $$M = H \| T,$$

e.g. the lower 32 bits store heads, the upper 32 tails. Bit-field isolation (BFXIL/BFI on Arm, BEXTR on x86 BMI2) and cross-field moves (RORX, logical rotates) let the CPU manipulate the two sub-vectors without branching and with the same latency profile as the dual-mask variant. Let $$V = \mathbb{F}_2^C$$

with the usual tensor product ⊗. The ordered pair of head- and tail-bitmasks is the direct sum $$V \oplus V \cong \mathbb{F}_2^{2C}.$$

Because finite-dimensional $\mathbb{F}_2$-vector spaces form a rigid symmetric-monoidal category $$(Vect_\mathbb{F}^{fd}, \otimes, \mathbb{F}_2),$$

the standard evaluation/coevaluation morphisms yield a natural isomorphism $$(H,T) \rightarrow (H \otimes e_0) \oplus (T \otimes e_1),$$

whose concrete matrix is a block permutation of the identity and therefore invertible. Thus, the packing/unpacking operation preserves all information without appealing to specialized Boolean-ring properties. The choice between layouts is therefore a micro-architectural optimization, not a semantic one.

(g) Memory-Footprint Impact—Substituting the two-pointer (head+tail) layout with the dual- or composite-mask scheme deletes 2×C×pointer-size bytes of node metadata, where C is the node's capacity; a single reference to the corresponding Price Level Descriptor now embedded in each order object often slips into padding that already exists to satisfy cache-line alignment (e.g., the 8-byte gap rounding a 56-byte payload up to 64 bytes), so it costs zero extra space and the node realizes the full 2×C×pointer-size saving. If the padding is smaller than a pointer, the compiler extends the object and the net win falls somewhere between C×pointer-size and 2×C×pointer-size, depending on how many slack bytes are reclaimed; should the legacy design have held only one pointer per order, the new scheme still saves up to C×pointer-size or at worst breaks even. Thus, by harvesting otherwise unused alignment holes, the practical reduction can exceed the baseline C×pointer-size estimate and—in the best-aligned case-approach the full 2×C×pointer-size gain.

Priority-Tracking Variants—The apparatus and methods detailed herein and the discussions that follow are illustrated with an embodiment that concurrently tracks both the highest- and lowest-priority items. This dual-tracking example is provided solely by way of illustration and should not be construed as limiting. Persons of ordinary skill in the art will appreciate that the lowest priority only tracking may likewise be implemented without departing from the scope of the present disclosure, simply by omitting the head mask path.

Formal Invariants—Let a node state be $\mathcal{N} = (O,H,T) \in O^C \times V^2$, where $O_i$ is either an order object or $\perp$ (empty slot). Define the slot-bit bijection $$\eta: i \rightarrow e_i.$$

The correctness of all subsequent transforms hinges on three invariants:
(a) Occupancy condition—All head/tail bits are subsets of the occupancy set; formally:

$$\mathrm{supp}(H) \cup \mathrm{supp}(T) \subseteq \{i \mid O_i \neq i\}$$

where for a bit-vector $$x = (x_0, x_1, \ldots, x_{C-1}) \in \mathbb{F}_2^C,$$

$$\mathrm{supp}(x) := \{i \mid x_i = 1\}.$$

(b) Head uniqueness—For every price level $\pi$, $$\sum_{i: A_i \text{ has price } \pi} H \cdot e_i \leq 1.$$

(c) Tail uniqueness—The analogous inequality on T.

Because XOR is the additive group law in V, these constraints define a Galois-closed subset $$i = \{(O,H,T) \mid \text{all conditions}(a)\text{-}(c)\text{hold}\}$$

of the product Boolean ring $O^C \times V^2$. Any affine self-map of $V^2$ that preserves the coordinate support of (H,T) is automatically an endomorphism of i, a fact that the matching engine exploits to prove correctness of each update.

Operators and Algebraic Toolkit—All mask manipulations are built from four word-parallel primitives, each expressible as a linear or affine map on V:

| Symbol | Definition (on x ∈ V) | Linear rank | Micro-op realization |
|---|---|---|---|
| $S_k$ | Left shift by k (x << k, zero-fill) | C − k | 1 cycle SHL/LSL |
| $R_k$ | Right shift by k (x >> k, zero-fill) | C − k | 1 cycle SHR/LSR |
| $P_k^R$ | Suffix-right-shift: Fix indices < k; send i > k → i + 1, i = k → 0 | C − 1 | SHL + AND mask |
| $P_k^L$ | Suffix-left-shift: Fix indices < k; send i > k → i − 1, i = C − 1 -> 0 | C − 1 | SHL + AND mask |
| $C_i$ | Clear bit i: $x \wedge \neg e_i$ | C − 1 (idempotent) | BTR or AND with negated mask |

The micro-op realizations shown in the above table are illustrative of x86-64 cores; Arm and other ISAs offer analogous single-cycle or fused instructions. All other transformations—e.g. prefix shifts, bit injections, or rank-1 toggles—compose these primitives and at most one sparse vector XOR. These maps are linear endomorphisms, therefore not necessarily invertible. Each is injective on the subspace that occurs at runtime (e.g. for $P_k$, vectors with zero in bit k beforehand), which is enough to preserve correctness. Under the Word-Ram cost model, each primitive is $\Theta(1)$ time; on real hardware the latency is dominated by a single 64-bit ALU pipe, schedulable parallel to data-cache fetches. By restricting attention to this toolkit, the matching engine guarantees:

(a) Branch-free critical paths— updates do not incur mispredictions.

(b) Constant-time worst case per node—no data dependent loops; time is bounded by two shifts+two bit-tweaks for bitmask updates.

(c) Information-theoretic minimality—since every operator preserves or reduces the Hamming weight of (H,T), the representation never fattens beyond 2C bits irrespective of workload.

These expanded definitions supply the algebraic foundation for all subsequent operations [0081]-[0090].

Non-Uniqueness of Update Equations—In the following Boolean vector space:

$$V = \mathbb{F}_2^C, V^2 = V \times V \cong \mathbb{F}_2^{2C}$$

A bitmask update routine transforms a state $(H,T) \in V^2$ into a new pair $(H', T')$. The most common implementation is an affine endomorphism $$F(H, T) = \phi\begin{pmatrix} H \\ T \end{pmatrix} \oplus b, \phi \in \text{End}(V^2), b \in V^2$$

because XOR ($\oplus$) is the additive law in $V^2$. But, the functional spec does not require linearity: any Boolean circuit that satisfies the following two conditions as well as maintaining the invariant of the system is admissible, even if it is non-linear. The correctness requirement is simply:
(a) $F(\text{supp}(H) \cap \text{supp}(T)) \subseteq \{i | O_i \neq \bot\}$ (mask bits never point to empty slots);
(b) F preserves the head/tail-uniqueness inequalities price-level-wise.

XOR$\leftrightarrow$OR Replaceability Under a Pre-condition—Consider the Prepend path (§ [0088]):
(a) Prefix shift $S_1$ is a zero-fill map, therefore it sets bit 0 to zero.
(b) An embodiment may choose either
(i) XOR Insertion $x \rightarrow x \oplus e_0$
(ii) OR Insertion $x \rightarrow x \vee e_0$ Because both yield the same result on that zeroed-out operand.
Thus, any affine update of the form in [0081] can be converted into a non-linear variant $$F_V(H,T) = (\phi_H(H,T) \nabla b_H) \| (\phi_T(H,T) \nabla b_T),$$

where $\phi$ is the linear part and $(b_H, b_T)$ are constant masks, without changing the logical book whenever the vacated bits are guaranteed to be 0 in the affine form. In that sense XOR and OR are inter-substitutable under the zero-filled operand pre-condition supplied by the shift operators.

Affine Endomorphisms, Non-Linearity, and Implementation Freedom—Hence, there are two different directions can be employed:
(a) Affine option—keeps the update inside the category of linear maps; rank, kernels, and composition can be reasoned about with matrices. The concrete rules we adopt use exactly one composition of the rank-deficient primitives ($S_k$, $R_k$, $P_k$, $C_i$) introduced in [0080] plus a translation vector b of Hamming weight $\leq 2$. The transition vector gives a rank $\leq 2$ perturbation—algebraically minimal and compiling to $\leq 2$ BTS/BTR/BTC p-ops per mask on x86-64 architecture.
(b) Non-linear option—replaces some XORs by ORs. Algebraic linearity is lost, but the correctness requirement defined in [0081] still hold, so the routine is functionally correct. In some cases, an embodiment might prefer OR for the following reasons:
(i) Idempotent flag-set: $x \vee e_0$ cannot clear a flag if the same write happens twice, which is useful under CAS retries or speculative aborts.
(ii) Concurrent safety: in case of a Data Holder Node being shared among two or more threads, multiple threads OR-ing the same bit only converge to 1; XOR could toggle to 0.
(iii) Zero hardware penalty: OR imm (immediate operand) and EOR/XOR imm are both single-cycle μ-ops on the latest x86-64 and AArch64.

Because both options satisfy the invariants, and because the matching engine never needs to invert the update, there is no canonical formula. An embodiment can therefore choose the variant that: minimizes latency on a particular ISA, exposes BFI/BFXIL fusion on AArch64, or aligns better with formal-verification strategy (affine maps are easier to reason about in Coq/SSReflect).

Conclusion on the Non-Uniqueness of Update Equations—Two routines $F_1$, $F_2$, whether both affine, both non-linear, or one of each—are observationally equivalent whenever they maintain the invariant in [0079] and satisfy the correctness requirement in [0081]. For each bitmask update equation stated herein, persons of ordinary skill in the art will recognize that an alternative or equivalent update rules may be employed; however, so long as the underlying set of features being evaluated is identical, each such implementation will produce the same resulting bitmask. Hence the specific shift-plus-flag equations as well as their mathematical reasoning presented in below are exemplary, not limiting: any mathematically consistent alternative (including, but without limitation, XOR $\leftrightarrow$ OR substitutions under zero-fill) remains within the disclosed scope.

Match-and-Insert Invariant, Stable Index Mapping (FIG. 16)—Let the order array before execution be the sequence $$O = (O_0, \ldots, O_{n-1}) O_i \in \mathcal{O} \cap \{\bot\}$$

where $\mathcal{O} = \{o | o \text{ is well defined order}\}$, and assume a set $D = \{d_1 < \ldots < d_r\} \subseteq \{0, \ldots, C-1\}$ of slots is about to be removed (order fills, cancels, etc.). Define the deletion map $$\prod = P_{d_r} \circ \ldots \circ P_{d_1},$$

where each $$P_{d_j}$$

is the suffix-left-shift operator that was introduced in [0080]. Because every $$P_{d_j}$$

deletes only bit information that corresponded to a deleted order, $\Pi(H,T)$ still satisfies the invariant requirement. Then, the matching engine performs the following updates:
(a) Payload compaction moves the suffixes of O left by the number of deletions r.
(b) Mask compaction applies the rank C−r deletion map $\Pi$.

During execution, a naïve application of $\Pi$ would seem to require r separate shifts; however, as long as r≤64 an embodiment can vectorize all of them into two machine-word shifts per mask by pre-computing the population count of deletions below each index and using a barrel-shifter. Thus, the mask update cost $$\Theta\left(\left\lceil \frac{r}{64} \right\rceil\right) = \Theta(1)$$

in the Word-RAM model whenever a node fits in one word—meeting the latency target for ultra-low-latency trading systems.

Simple Append (a special case of element 705), (FIG. 17)—Suppose the Data Holder Node currently holds k<C active slots, so the incoming order is appended at index k. Define the rank-1 toggling vector $$\delta_T = (e_k \otimes e_{k-1}),$$

i.e. clear bit at k−1 and set bit at k. Then, the matching engine updates the bitmasks with the following equations:

$$H'=H, T'=T \otimes \delta_T.$$

This equation has the following algebraic properties:
(a) Rank argument—$T \to T \otimes \delta_T$ differs from the identity by a matrix of rank 1; hence it is the minimal linear perturbation that can relocate a single 1-bit.
(b) Endomorphism of i—Because the perturbation only affects two indices, both of which are known occupied (k−1 and k), the subset invariant is preserved. Head/tail uniqueness is preserved because exactly one bit per price level remains set.
(c) µ-op realization—For example, on x86-64:
  (i) BTR mask, (k−1)—bit-test-and-reset (clears the old tail flag).
  (ii) BTC mask, k—bit-test-and-complement (sets the new tail flag).
  These two µ-ops share no data dependency except through the mask register, giving a dependency depth 1 and retiring in ≤2 cycles even on a narrow superscalar front end.

Thus, the best-case and worst-case latency of Simple Append differ by at most two ALU µ-ops.

Generalized Append (general case of element 705, 706), Suffix-Shift Transform and Bit-Flag Injection (FIG. 17)—Unlike the simple "size=k" case, a general Append may insert at an interior slot k even when higher indices already contain orders. The matching engine therefore performs two coupled actions:
(a) Open a gap in both payload and masks—Assume the node currently holds k' live orders (0≤k<k'−1<C). Using the suffix-right-shift operator, $$P_k : V \to V, \; (P_k x)_i = \begin{cases} x_i & i < k \\ 0 & i = k \\ x_{i-1} & k < i < C \end{cases}$$

which is injective on the subspace $\{x \mid x_{C-1}=0\}$, because just before the Append, the ending slot C−1 is vacant or about to be evicted. If the slot C−1 was occupied before the Append, apply Push Back to evict the spot. Because the entire node's information (assuming C≤64, if not, expand this model using two or more 64-bit integers) fits in one 64-bit word, the suffix-right-shift operator executes in $\Theta(1)$ time.

(b) Define a predicate for the new order—After performing bitmask update of Eq. 1, we define a generalized predicate φ as follows:

$$\varphi(a) = \begin{cases} 1 \\ 0 \end{cases}$$

if the incoming order a carries a Price Level Pointer otherwise Formally,

φ(a)={⟨a, 1⟩|a∈ $\mathcal{O}$ ∧PLP(a)}∩{⟨a, 0⟩|a∈ $\mathcal{O}$ ∧¬PLP(a)}. The predicate determines whether the incoming order "a" would carry a Price Level Pointer if it was a pointer-based embodiment. For example, the general insertion case element 706, Append is invoked as a part of creation of a new price level, and thus φ(a)=1. By contrast, the insertion case of element 705 would be φ(a)=0 because the price level for that order already exists in the matching engine's order book, and thus the incoming order would not carry a Price Level Pointer. For the case of Append as Push Forward-derivative (see [0051] for reference), φ(a) would determine whether the corresponding Price Level Pointer is being pushed forward together with order a. φ(a) is called generalized because it's defined separately in both highest- and lowest-priority context. (respectively, $\varphi_H(a)$, $\varphi_T(a)$) To eliminate any confusion, φ(a) is defined solely for the incoming order that's being passed as an argument of the Append, and not for the pre-existing orders in a Data Holder Node.

(c) Bitmask update equations
  (i) For the case of Append as Push Forward-derivative, the case divides to two cases: whether the Appended Data Holder Node is full or not. If not full, then the matching engine updates bits with the following branchless way:

$$\begin{pmatrix} H' \\ T' \end{pmatrix} = \begin{pmatrix} P_k & 0 \\ 0 & P_k \end{pmatrix} \begin{pmatrix} H \\ T \end{pmatrix} \oplus \begin{pmatrix} \varphi_H(a)e_k \\ \varphi_T(a)e_k \end{pmatrix}$$

Where k is the index of the slot being inserted. If the Data Holder Node being appended is full, the case turns to another cascaded-Push Forward case. After the Push Forward of the order at index 0, the Data Holder Node should now have an empty slot, and the case resolves to the above "non-full" case. This concludes for Append as Push Forward-derivative.

(ii) For the case of Append as a general case of element 705, 706—this case also divides into element 705 and 706. In case 705, there is no new price level being created, and thus φ(a)=0 for both highest- and lowest-priority for the incoming order's price level. Also, the incoming order is being appended to the existing priority, thus it will replace the older lowest-priority flag for that price level. For the case 706, a new price level is being created, thus φ(a)=1 for both highest- and lowest-priority for its price level. Also, the case 706 does not need reallocation of the bit flag since the incoming order is the sole order at that price level. Then, the matching engine updates the bitmask with the following branchless way:

$$\begin{pmatrix} H' \\ T' \end{pmatrix} = \begin{pmatrix} P_k & 0 \\ 0 & P_k \end{pmatrix} \begin{pmatrix} H \\ T \end{pmatrix} \oplus \begin{pmatrix} \varphi_H(a)e_k \\ e_k \end{pmatrix} \oplus \begin{pmatrix} 0 \\ \neg \varphi_T(a)e_{k-\delta(k)} \end{pmatrix}$$

where δ(k) in this context, is defined as follows:

$$\delta(k) := 1 - \delta_{k0} = \begin{cases} 0 & \text{if } k = 0 \\ 1 & \text{otherwise} \end{cases}$$

The purpose of δ(k) is to confine the index within the canonical basis boundary when k=0.

FIG. 17 annotates the before-and-after masks, showing the suffix shift and the newly raised bit at index k; all other price levels retain their head/tail markers unchanged, preserving the invariant defined in [0079]. The entire mutation, payload move plus mask update, remains constant time on any node.

Generalized Prepend, Prefix-Shift Transform and Bit-Flag Injection (FIG. 18)—In one embodiment that does not implement the "jump to the front" function, Prepend always inserts the incoming order at slot index 0. For the "jump to the front" function, which may involve prepending an order at non-zero index location, a different prefix-shifting can be employed ($S_k$, where $1 < k < C$). For simplicity, this paragraph describes a general scenario where the insertion is done at index 0. Then, the matching engine shifts every pre-existing order (and its metadata) one index higher. Let $$S_1 : V \to V, S_1(x) = x \ll 1 \bmod 2^C$$

which has $\text{rank}(S_1) = C-1$; injective on vectors with $x_{C-1} = 0$, since either the node was not full, or the order in the first slot (index 0) is about to be evicted via the Push Forward operation. Then, the matching engine updates the following:

(a) Prefix-shift of both masks—If the node was full, the matching engine evicts the first order and its corresponding bit via the Push Forward. If the first slot was evicted, the rest of the orders and the bitmasks are already aligned and thus there is no need for an additional shift. However, if the node was not full, the matching engine uses the above defined $S_1$ operator. Then, the shifting operator is defined as:

$$\phi = \begin{cases} I \\ S_1 \end{cases}$$

if the first slot was evicted before the Prepend otherwise where $I : V \to V$ is the identity matrix defined in the respective dimension.

(b) Adjust head and tail flags for the new order—In case of prepending due to creating a new price level (element 706), by definition, the prepended order is both highest- and lowest-priority at its price level w since it's the sole order at its price level, thus we have:

$$\begin{pmatrix} H' \\ T' \end{pmatrix} = \begin{pmatrix} (I-E_0)\phi & 0 \\ 0 & (I-E_0)\phi \end{pmatrix} \begin{pmatrix} H \\ T \end{pmatrix} \oplus \begin{pmatrix} e_0 \\ e_0 \end{pmatrix}$$

where $E_0$ is defined as an outer product of canonical basis $e_0$, $$E_0 = e_0 e_0^T, (I - E_0) \in \text{End}(V),$$

or simply as non-linear expressions, $H' = \phi H \nabla e_0$ (sets bit 0 unconditionally)

$T' = \phi T \nabla e_0$ (likewise sets bit 0).

However, if the price level w already existed, wherein the case Prepend is invoked as a derivative mechanism of Push Back, then there is no guarantee that the newly inserted order is either highest- or lowest-priority at its price level. Then, the matching engine uses the generalized predicate defined in [0087]:

$$\varphi(a) = \begin{cases} 1 \\ 0 \end{cases}$$

if the prepended order a carries a Price Level Pointer In other words, the predicate $\varphi(a)$ tells whether the prepended order would carry a Price Level Pointer if it was a pointer-based embodiment. Then, the matching engine updates the bitmasks with the following equations:

$$\begin{pmatrix} H' \\ T' \end{pmatrix} = \begin{pmatrix} \phi & 0 \\ 0 & \phi \end{pmatrix} \begin{pmatrix} H \\ T \end{pmatrix} \oplus \begin{pmatrix} \varphi_H(a) e_o \\ \varphi_T(a) e_o \end{pmatrix}$$

This concludes the bit-shifting for Prepend method.

(c) Complexity analysis—The metadata update performs one 64-bit shift per mask, up to two 64-bit word writes, and no data-dependent branches inside the critical path (the result of the predicate $\varphi(i)$ is already known at the time of invocation of Prepend). Thus, the prepend path retains $\Theta(1)$ latency, matching the information-theoretic lower bound for inserting one order and updating at most two Boolean flags.

Push Back (FIG. 19)—When Append targets a full node (size=C), the engine decides which order to relocate to the succeeding node by comparing the priority of the tail order (slot i=C−1) and the incoming order. If the incoming order is being relocated to the succeeding node, the current node's state does not change. The following is description of the tail order eviction case. (Eviction at slot i=C−1)

(a) Node state and invariant—The mapping "slot i→bit i" is a bijection between the set of occupied slots and the set of bits that are 1 in either mask. Inside the Boolean ring $\langle \{0,1\}^C, \otimes, \wedge \rangle$ each mask is simply a length-C Boolean vector.

(b) Clearing the information of the evicted order—The operator "clear bit" is the Boolean-ring endomorphism $$C_{C-1} : x \to x \wedge \neg e_{C-1}.$$

Because it fixes every bit except the one being cleared, it is idempotent but not invertible; that is exactly what we need when permanently removing the tail slot. Also, at the same time the matching engine calculates the generalized predicate that will be used in the following derived-Prepend operation for the evicted order $$\varphi_x(a) = \{\langle x, 1 \rangle | x \in V \wedge e_{C-1}^T x = 1\} \cup \{\langle x, 0 \rangle | x \in V \wedge e_{C-1}^T x = 0\}$$

where $x \in \{H, T\}$ in the above expression is each bitmask. Then, the matching engine updates the bitmask of the Data Holder Node as follows:

$$\begin{pmatrix} H' \\ T' \end{pmatrix} = \begin{pmatrix} C_{C-1} & 0 \\ 0 & C_{C-1} \end{pmatrix} \begin{pmatrix} H \\ T \end{pmatrix}$$

(c) Transforming the node—Removing the last order restricts the index set from $\{0, \ldots, C-1\}$ to $\{0, \ldots, C-2\}$; the identity map on those surviving indices remains a bijection and preserves their natural order. Applying the clearing endomorphism to H and T therefore maintains the slot-bit bijection on the smaller index set. After the relocation, the matching engine proceeds the insertion process as Prepend on the successor node.

(d) Cost—One order is copied out, two single-word Boolean-ring operations are executed. Constant time irrespective of C.

Push Forward (FIG. 20)—When Prepend targets a full node (size=C), the matching engine decides which order to relocate by comparing the priority of the head order and the incoming order. In case the incoming order is relocated, the current node's state does not change. The following description is for the case when the matching engine evicts the head order (slot i=0) and transfers it to the immediately preceding node. It then reevaluates the generalized predicate φ(a) from [0087] by checking whether that displaced order retains a corresponding Price Level Pointer. Then, the matching engine updates the bitmask of the Data holder Node as follows (a) Define a shift down operator—On the sub-space $\{x \in V | x_0 = 0\}$ the logical right shift operator $R_1: V \to V$ is defined as:

$$R_1(x) = (x >> 1).$$

R(x) preserves XOR and AND, so is an endomorphism of the Boolean ring $\langle \{0,1\}^C, \otimes, \wedge \rangle$. Because all vectors fed into $R_1(x)$ satisfy $x_0 = 0$, no information is lost when the shift discards bit 0. Within this subset, $R_1$ is therefore injective (one-to-one) onto the subset $\{x \in V | x_0 = 0\}$.

(b) Order-index bijection—The map on slot indices, $$i \to i-1 (1 \leq i \leq C-1)$$

is an order-preserving bijection from the old index set $\{1, \ldots, C-1\}$ onto the new set $\{0, \ldots, C-2\}$ Applying $R_1(x)$ to both masks transports every '1' bit through exactly this bijection, thus the slot-bit invariant is maintained.

(c) The bitmask update—The matching engine calculates the generalized predicate that will be used in the following derived-Append operation for the evicted order $$\varphi_x(a) = \{\langle x, 1 \rangle | x \in V \wedge e_0^T x = 1\} \cup \{\langle x, 0 \rangle | x \in V \wedge e_0^T x = 0\}.$$

Then, the matching engine updates bitmasks as follows:

$$\begin{pmatrix} H' \\ T' \end{pmatrix} = \begin{pmatrix} R_1 & 0 \\ 0 & R_1 \end{pmatrix} \begin{pmatrix} H \\ T \end{pmatrix}.$$

In case where the shifting operator $R_1$ is defined as non-zero-fill, (particularly, in non-linear expressions that use non-zero-fill shifting operators)

$$\begin{pmatrix} H' \\ T' \end{pmatrix} = \begin{pmatrix} C_{C-1} & 0 \\ 0 & C_{C-1} \end{pmatrix} \begin{pmatrix} R_1 & 0 \\ 0 & R_1 \end{pmatrix} \begin{pmatrix} H \\ T \end{pmatrix}$$

After the transfer, the insertion continues as Append on the predecessor node. If the predecessor is also full, the hop repeats toward the book head. The shift of both masks keeps the relative position of any existing Price Level Pointer correct after the physical order array shift, and the cascade depth cap again bounds latency.

Introduction to Flexible Node Capacity—In one embodiment, the maximum number of orders a Data Holder Node can hold is defined as a monotone, non-increasing function of its depth—the number of hops from the order-book head. Nodes at or near the head experience orders-of-magnitude higher access rates than those further away, thus allocating larger contiguous blocks to these "hot" nodes amortizes cache-line shifts and reduces the frequency of Push-Back/Push-Forward cascades. Nodes deeper in the book, by contrast, may stay intentionally "thin," shrinking their cache- and TLB-footprint without harming latency-critical paths. This depth-aware sizing preserves all slot-bitmask invariants introduced in [0079] while aligning memory usage with observed locality, thereby lowering the expected L1-miss cost per matched or modified order.

Scope-Neutral Disclaimer—The mathematical derivation of depth-aware Flexible Node Capacity strategy (§§ [0091]-[0098]) and the machine-learning optimization loop (§§ [0099]-[0102]) are provided solely as exemplary implementations. Practitioners of ordinary skill may employ other analytical or data-driven techniques—e.g., a whole-book latency-minimization objective, reinforcement-learning controllers, static heuristics, or rule-based reallocators—without departing from the teachings or claimed subject matter of this disclosure.

Formal Introduction to Flexible Node Capacity—Let $$\kappa: \omega \to \mathbb{N}_{\geq 1}, d \to C_d$$

assign to every Data Holder Node at distance $d \in \omega$ from the order book head (hereunder "depth"), an order capacity $C_d$. Assume the following constraints:

(a) Monotone non-increasing property, $$C_0 \geq C_1 \geq C_2 \geq \ldots$$

(b) Maximum order capacity, $$C_0 \leq C_{Max} \leq 64$$

such that each bitmask can describe the entire node's status within one 64-bit word. When an embodiment requires a relaxed requirement for the maximum order capacity, use two or more words for each bitmask.

(c) No artificial cap in the total order book size, $$\sum_{d < \omega} C_d = \infty.$$

The rationale for the above assumption is as follows: Empirical telemetry on live matching engines shows that the access frequency decays super-exponentially with depth; allocating larger buckets near the head amortizes O(1) updates over more orders while keeping tail pages leaner and cache-friendlier.

Order Book System Model—Let the order book be represented by a finite sequence of Data Holder Nodes, $$\mathcal{N} = (N_k)_{k=0}^{D}$$

where $N_0$, $N_D$ are the first Data Holder Node and the last Data Holder Node in the order book chain, respectively. A cascade operation is a sequence of state transitions, $\sigma_0 \to \sigma_1 \to \ldots$. A state $\sigma$ is defined by the configuration of orders in $\mathcal{N}$ and the index k of the currently operative node $N_k$.

Recursion Safety on Cascades—Both Push Forward and Push Back cascade algorithms are governed by a strictly decreasing measure on a well-ordered set, which guarantees their termination. Therefore, infinite recursion is mathematically impossible regardless of any changes to Data Holder Node capacities. Here's the proof:

(a) Push Forward cascade safety—Let $\to_{PF}$ be the state transition relation for a Push Forward cascade. A transition moves the operative focus from a full node $N_k$ to preceding node $N_{k-1}$. Define a ranking function $f_{PF}$ mapping the state a to the well-ordered set $(\mathbb{N}, >)$:

$$f_{PF}(\sigma):=k$$

For any transition from a state with operative index k to one with index k−1, the rank strictly decreases ($f_{PF}(\sigma') < f_{PF}(\sigma)$). As the rank is a natural number bounded below by 0, the relation is well-founded, and no infinite Push Forward cascade can exist.

(b) Push Back cascade safety—Let the measure of a state a whose operative node is $N_k$ be the lexicographically ordered pair:

$$f_{PB}(\sigma)=(c(\sigma),d(\alpha)) \in \mathbb{N} \times \mathbb{N}$$

where $c(\sigma)$ is the total number of full nodes from $N_k$ to the tail (inclusive), and $d(\sigma)$ is the distance from $N_k$ to the tail. During a transition from state a (at index k) to $\sigma'$ (at index k+1), the primary measure $c(\sigma)$ cannot increase.
  (i) If $c(\sigma') < c(\sigma)$ (which occurs if node $N_k$ becomes non-full and this change is not offset by other nodes becoming full), the pair strictly decreases.
  (ii) If $c(\sigma')=c(\sigma)$, the secondary measure $d(\sigma)$ strictly decreases:

$$d(\sigma') < d(\sigma).$$

In all cases, the pair $(c(\sigma), d(\sigma))$ strictly decreases with respect to the lexicographical order on $\mathbb{N} \times \mathbb{N}$. Since this order is well-founded, infinite Push Back cascades are impossible.

Derivation of Latency Cost Model—Consider an optimization problem of processing latency per order basis.
  (a) Formal introduction—An embodiment may implement minimization of the following cost function:

$$L_i(k)=P_{L1}(i)T_{hit}(k_j)+[1-P_{L1}(i)]T_{miss}(k_j)$$

where, $L_i$ is the processing latency of order i which is contained in the Data Holder Node at depth j, $k_j$ is the capacity of that Data Holder Node, $P_{L1}$ is the probability of order i being in L1 cache, $T_{hit}$ is the processing latency at L1 cache hit, and $T_{miss}$ is the processing latency at L1 cache miss. One thing to note here is that $T_{hit}$ and $T_{miss}$ are both functions of the Data Holder Node size $k_j$, since every insertion/deletion requires adjustment of the entire node storage, thus $T_{hit}$, $T_{miss}$ grow linearly with $k_j$. Then, $$T_{hit}(k_j) = Ak_j,\ A = \frac{t_c + wu}{2},\ T_{miss}(k_j) = Ak_j + t_m$$

where $t_c$ is L1 cache round trip latency (~4 CPU cycles), w is write/all-access ratio, u is slot shifting latency (~5 CPU cycles per shifted order, assuming each order size is 64 bytes), and $t_m$ is the remote memory access penalty (normally, +120 CPU cycles). The constant A reflects the expected value of linear scan and shift cost.

(b) Empirical access model—The empirical order book data from one of the most liquid books, such as Nvidia stock, shows that the orders in the top of the book are exponentially more likely to be accessed than the orders in the deeper region of the order book. This shows a remarkably straight line on a log-log plot. Consequently:

$$\text{\# of updates}(l) \propto l^{-\beta}$$

where β is an empirical parameter to be determined from actual data, and l is each price level counted from the top of the book. Then, assume that a price level that is closer to the top of the book contains exponentially more orders than the remote price levels $$n_l = n_1 e^{-\gamma(l-1)} (\gamma > 0).$$

where $n_1$ is the number of orders contained in best bid-ask price level (top of the book). For simplicity, within the price level, assume that the orders in the front are equally likely to be hit as the orders in the back of the queue.

$$\Pr(\text{hit offset } j | l) = 1/n_l.$$

Then, an embodiment can construct the per-order hit probability as follows:

$$p_{l,j} = Pr(\text{price level } l)Pr(\text{offset } j|l) = \frac{l^{-\beta}}{Z_{|v|}} \cdot \frac{1}{n_l}.$$

where the following normalizer is used in the above equation, $$Z_{|v|} = \sum_{m=1}^{\infty} m^{-\beta}$$

(Across price levels, Riemann zeta series)

Putting it together gives, $$p_l = \frac{l^{-\beta}}{Z_{|v|} n_l}.$$

(c) Sanity checks—The postulated exponential decay of queue length with price level depth holds only when the decay constant γ is re-estimated from live telemetry, and not hard-wired to the first few ticks, which are frequently "humped" rather than monotone. Parameter γ—and, by extension, any distributional parameter—therefore resides squarely within an implementer's design freedom and does not limit the scope of the invention. Likewise, the intra-level hit-probability term is meaningful only under FIFO or price-time priority; in a pure pro-rata matcher the offset-within-level factor collapses to unity, leaving a model driven solely by the cross-level term.

Mapping Back to the Global Linear Rank i—For algorithms that need the one-dimensional ranking used in earlier sections:

$$i = \sum_{m<l} n_m + j \Rightarrow l = 1 + \frac{1}{\gamma} \ln \frac{n_1}{n_l},$$

(a) Recap of the ingredients:

| Component | Formula | Parameter |
|---|---|---|
| Level-hit frequency | # of hits(l) $\propto l^{-\beta}$ | $\beta > 1$ |
| Queue length | $n_l = n_1 r^{l-1}$, $r = e^{-\gamma}$ | $\gamma > 0$ |

Normalizers:

$$Z_{|v|} = \sum_{m=1}^{\infty} m^{-\beta}$$

$$N_{max} = \frac{n_1}{1-r}.$$

(b) Conversion of prefix-sum—A resting order with global rank i ($1 \leq i < N_{max}$) sits in the unique price level l that satisfies $$i = S_{l-1} + j,$$

$$S_{l-1} = n_1 \frac{1 - r^{l-1}}{1 - r},$$

$1 \leq j \leq n_j$ where $S_{l-1}$ is prefix-sum up to the price level l−1, and j is the offset within the price level l. Here l(i) is defined as the ordinal price level (not an actual price) for rank i, which is a natural number. Therefore, the effect of j inside of logarithm becomes negligible. Solving for l without j gives:

$$l(i) = 1 + \frac{\ln\left[1 - \frac{(1-r)i}{n_1}\right]}{\ln r}$$

because $1 \leq i < N_{max}$, the value of the bracket is in [0,1) range, which makes the logarithm in the numerator negative. Since $\ln r = -\gamma < 0$, the expression l(i) as whole is well-defined and $l(i) \geq 1$ throughout the live book.

(c) Express $n_l$ and $l^{-\beta}$ in terms of i—Inserting the l(i) expression in (b) into $n_l = n_1 r^{l-1}$ gives:

$$n_l(i) = n_1 r^{l(i)-1} = n_1 r^{\frac{\ln\left[1 - \frac{(1-r)i}{n_1}\right]}{\ln r}} = n_1 \left[1 - \frac{(1-r)i}{n_1}\right]$$

using $N_{max} = n_1/(1-r)$, $n_l(i) = (1-r)(N_{max} - i)$.

For level factor $l^{-\beta}$, it is straightforward from the expression in (b):

$$l^{-\beta} = \left[1 - \frac{1}{\gamma} \ln\left(1 - \frac{i}{N_{max}}\right)\right]^{-\beta}.$$

(d) Assembling $p_i$—Substituting the result of (d) into the result of [0096](b), $$p_i(\beta, \gamma) = \frac{1}{Z_{|v|}(1-r)} \cdot \frac{\left[1 - \frac{1}{\gamma} \ln\left(1 - \frac{i}{N_{max}}\right)\right]^{-\beta}}{N_{max} - i}.$$

(e) Asymptotic expressions:
Near the top of the book, let x be, $$x = \frac{i}{N_{max}} \ll 1.$$

Then, $$l(i) = 1 - \frac{\ln(1-x)}{\gamma} = 1 + \frac{x}{\gamma} + O(x^2),$$

$$l(i)^{-\beta} = 1 - \frac{\beta}{\gamma} x + O(x^2),$$

$$\frac{1}{N_{max} - i} = \frac{1}{N_{max}}(1 + x + O(x^2)).$$

Therefore, $$p_i = \frac{1}{Z_{|v|} n_1}\left[1 + \left(1 - \frac{\beta}{\gamma}\right)x + O(x^2)\right] (i \ll N_{max}).$$

In the deeper book, set
$i = N_{max}(1-\varepsilon)$ with $\varepsilon \downarrow 0$.
Then,
$N_{max} - i = \varepsilon N_{max}$,
and $$l(i) = 1 - \frac{\ln \varepsilon}{\gamma} = 1 + \frac{|\ln \varepsilon|}{\gamma} \Rightarrow l(i)^{-\beta} \approx \left(\frac{\gamma}{|\ln \varepsilon|}\right)^{\beta}.$$

Therefore, $$p_i \approx \frac{1}{Z_{|v|} n_1} \cdot \frac{\left(\frac{\gamma}{|\ln \varepsilon|}\right)^{\beta}}{\varepsilon} (i = N_{max}(1-\varepsilon), 0 < \varepsilon \ll 1).$$

Hence the tail decays like $1/[\varepsilon|\ln \varepsilon|^{\beta}]$, which is considerably flatter than the naive power law $l^{-\beta}$. This is because as the book goes deeper, the price level also becomes shorter ($n_l \downarrow 0$).

Derivation of Optimal Node Capacity—Based on the probabilistic model derived in the above paragraph, an embodiment may derive the further concrete model as follows:

(a) Probability that a whole node is cached— A node sits in L1 if and only if any order in it was accessed recently. For small probabilities $p_i$, and deeper nodes are assumed to have a small node size $k_j$, $$P_{L1}(\text{node } j) = 1 - \prod_{n=0}^{k_j - 1}(1 - p_{s_j + n}) \approx \sum_{n=0}^{k_j - 1} p_{s_j + n} = P_j(k_j)$$

where $s_j$ in this context is defined as the global rank (1-based) of the first order stored in node j. Since every write/delete on an order requires linear adjustment of the entire storage of the node, it's reasonable to assume that every order in the same node has the same cache-hit probability $p_{s_j+n} = p_{s_j}(n=0, \ldots, k_j-1)$.

Summing over the node gives:

$$P_j(k_j) = \sum_{n=0}^{k_j-1} p_{s_j+n} = k_j p_{s_j}.$$

(b) Per-order cost inside node j—Insert the last identity into the equation derived in [0096](σ):

$L_i(k_j) = Ak_j + [1 - P_j(k_j)]t_m$ where A, $t_m$ are previously introduced in [0096](a). Except for the additive constant $t_m$, the only part that depends on the node size is $\Delta_j(k_j) = Ak_j - P_j(k_j)t_m$.

(c) Minimizing $\Delta_j(k_j)$ at deep nodes—Translation to computer-executable instructions requires $P_j(k_j)$ in closed form. Using the derivation result in [0097] and assuming the node is "thin" compared with its distance from the top ($k_j \ll s_j$), the following asymptotic expression is achieved for the deep nodes, $$p_{s_j} \approx \frac{C_{top}}{1 - \frac{s_i}{N_{max}}} \left( \left| \ln\left[1 - \frac{s_i}{N_{max}}\right] \right| \right)^\beta$$

where, $C_{top}$ is defined as:

$$C_{top} := \frac{1}{Z_{|v|}n_1}.$$

Using the result:

$$P_j(k_j) = \sum_{n=0}^{k_j-1} P_{s_j+n} = k_j p_{s_j}$$

gives, $\Delta_j(k_j) = k_j[A - t_m p_{s_j}]$.

Because $p_{s_j}$ is already extremely small, there exists a rank $s^\dagger$, such that $\exists s^\dagger \text{ s.t. } p_{s^\dagger} = \frac{A}{t_m}$.

For every node whose first rank satisfies $s_j > s^\dagger$, $\Delta j(k_j) = k_j[A - t_m p_{s_j}] > 0$ the coefficient in the above bracket is positive, which implies $k_j^* = k_{min}$ as the optimal node size.

(d) The nodes near top of the book—At near the top of the book, the assumption ($k_j \ll s_j$) no longer holds. Therefore, this case requires a more precise derivation without the linearization. Using $\ln(1-x) \approx -x$, $$P_j(k_j) = 1 - \prod_{n=0}^{k_j-1}(1 - p_{s_j+n}) \approx 1 - \exp\left(-\sum_{n=0}^{k_j-1} p_{s_j+n}\right).$$

From the asymptotic expression that was derived in [0097], $$p_i = \frac{1}{Z_{|v|}n_1}\left[1 + \left(1 - \frac{\beta}{\gamma}\right)x + O(x^2)\right].$$

Because $x \approx 0$ at near top of the book, take only O(1) term from above. Also using $p_{s_j+n} = p_{s_j}$ for (n=0, ..., $k_j-1$), gives:

$$1 - \exp\left(-\sum_{n=0}^{k_j-1} p_{s_j+n}\right) \approx 1 - \exp(-k_j C_{top}).$$

Then, the derivative of $\Delta_j$ is given as:

$$\frac{d\Delta_j}{dk_j} = A - t_m \frac{\partial P_j(k_j)}{\partial k_j} = A - t_m C_{top}\exp(-k_j C_{top}),$$

which, crosses zero at $$k_j^* = \frac{1}{C_{top}}\ln\left[\frac{t_m C_{top}}{A}\right].$$

Thus, the optimal top-node size grows logarithmically with $t_m/A$, which logically makes perfect sense because,
  (i) a large L1-cache miss penalty $t_m$ pushes the designer to pack more orders into the top nodes, such that a single cache load amortizes the cost,
  (ii) whereas a large per-shift scan cost A favors smaller nodes to curtail the linear work done on every modification.
Dimension analysis confirms the mathematical soundness of the formula: both $t_m$ and A are measured in CPU cycles, thus their ratio is dimension-free. Also, $C_{top}$ is a dimensionless quantity, which in turn confirms $k_j^*$ as dimensionless quantity. Therefore, the above formula is well-posed.

(a) Practical caveat for the first few price levels—The derivation relies on the exponential decay $n_l = n_1 e^{-\gamma(l-1)}$, which holds empirically deeper in the book. The first one to five ticks of many liquid equities exhibit a "hump"—queue lengths that are longer than the extrapolated exponential. Because the model underestimates the true hit probability for such orders in top nodes, the analytic value $k_j^*$ should be treated as a conservative lower bound for the actual top-node size. If tighter sizing is required, replace the exponential tail by a richer density—e.g. a discrete-Gamma fit or a lightweight neural regressor. Either alternative plug seamlessly into the latency formula but introduces additional parameters and runtime cost; the incremental complexity must be weighed against the (usually modest) latency savings.

Machine Learning based Parameter Optimization—In one embodiment, the parameters used in the above ($\beta,\gamma$) can be learned on-the-fly and be optimized to the real time data. Every order hit generated by the matching engine can be immediately turned into one stochastic-gradient step using the otherwise idle SIMD arithmetic units.

(a) Data point definition—For every incoming message or appropriately sampled message that is routed to a resting order an embodiment can log (or generate on-the-fly):

| Symbol | Recorded Value |
| --- | --- |
| $l_t$ | Price level index (ordinal rank) of the hit at time t |
| $n_t$ | Queue length just before the hit (number of resting orders at that price level) |

(b) Probabilistic model recap—From [0096](b), $$p_\theta(\beta, \gamma) = \frac{l^{-\beta}}{Z_{|v|} n_l}$$

where $n_l = n_1 r^{l-1}$, $r = e^{-\gamma}$ and the Riemann zeta series $Z_{|v|}$ can be approximated by truncating tail terms at certain threshold. The per-event negative log-likelihood is $l_t(\theta) = \beta \ln l_t + \ln Z_{|v|}(\beta) + \ln(n_l)$.

(c) Online stochastic-gradient update for ($\beta,\gamma$):
(i) Gradients $$\partial_\beta l_c = \ln l_c + \frac{\partial_\beta Z_{|v|}}{Z_{|v|}}, \quad \partial_\beta Z_{|v|} = -\sum_{m=1}^{M_{max}} (\ln m) m^{-\beta};$$

$$\partial_\gamma l_t = \partial_\gamma \ln(n_l) = -(l_t - 1).$$

where $M_{max}$ is aforementioned truncating threshold. Because $\partial_\beta Z_{|v|}$ only depends on $\beta$, an embodiment may cache the series value and its derivative and refresh them every few thousand steps for computational efficiency.

(ii) Adaptive-SGD rule $$\theta_{t+1} = \prod_{(1,\infty)\times(0,\infty)} [\theta_t - \eta_t g_t], \quad g_t = (\partial_\beta l_t, \partial_\gamma l_t)^T$$

where $\eta_t = \eta_0/(1+\lambda t)$ (sliding learning-rate schedule, or Adam if necessary), and $\Pi$ is a projection operator onto the admissible region $\beta > 1$, $\gamma > 0$.

(d) Lightweight streaming alternative for $\gamma$—Since the queue length process $\{n_l\}$ evolve much more slowly than hit locations, an embodiment may instead, estimate $\gamma$ by running regression of $\ln n_l$ on $l$. Then, $\ln n_l = \ln n_1 - \gamma(l-1) + \varepsilon_l$.

Maintain exponentially weighted moments (Welford update, weight $\alpha \ll 1$):

$\bar{l}_t = \bar{l}_{t-1} + \alpha(l_t - \bar{l}_{t-1})$, $\bar{y}_t = \bar{y}_{t-1} + \alpha(\ln n_{l_t} - \bar{y}_{t-1})$, $S_{ll,t} = (1-\alpha)(S_{ll,t-1}) + \alpha(l_t - \bar{l}_{t-1})(l_t - \bar{l}_t)$, $S_{ly,t} = (1-\alpha)(S_{ly,t-1}) + \alpha(l_t - \bar{l}_{t-1})(\ln n_{l_t} - \bar{y}_{t-1})$, where $S_{ll,t}$ is weighted variance accumulator of price levels, and $S_{ly,t}$ is weighted covariance accumulator between level and log-depth. Then, $$\gamma_t = -\frac{S_{ly,t}}{S_{ll,t}}$$

(e.g. $\alpha \approx 10^{-5}$ for ~0.1 s half life).

This estimator can run in parallel with the SGD step for $\beta$.

(e) Advanced learning with Multi-Layer Perceptron—When more accurate estimation is required, an embodiment may implement multi-layer perceptron or any similar advanced algorithm to wrap up the above logic and implement more advanced update scheme. As an exemplary implementation, first, make the three scalar parameters $\omega_\beta$, $\omega_\gamma$ inside the network. Then, pass them through softplus+constant to enforce the constrains, such as $\beta = 1 + \text{softplus}(\omega_\beta)$, etc. The forward pass computes the log-probability and the depth regression loss; back-propagation updates the weights jointly with any other features that an embodiment wishes to learn, such as volatility, time-of-day embeddings, etc. An embodiment may even directly estimate the node-hit probability $P_j$ ($k_j$) using advanced machine-learning models. The entire machine-learning block remains a fully differentiable component that can be plugged into a reinforced-learning style, latency-throughput objective.

Integration with Node-size Controller—In one embodiment, the node size update algorithm may be implemented in the following exemplary way: Every $T_{rebalance}$ (e.g. 10 ms or 100,000 messages), read the latest parameters and re-compute the optimal size k* for each node. If k* varies more than a certain amount (e.g. k* varies 2 or more), resize the Data Holder Nodes by (a) dynamically allocating new Data Holder Nodes in each memory pool based on the new optimal capacity; and (b) retiring or recycling Data Holder Nodes whose capacities no longer conform.

Memory Allocator Integration—An embodiment may have the core-local memory pool pre-carve a small set of node-size classes—for example, 8-, 16-, 32-, and 64-slot Data Holder Nodes—at start-up. When the order book needs to grow or shrink, the engine can then swap in a pre-built node in a single pointer assignment, avoiding the latency of a fresh heap call. Where hardware constraints or memory-footprint targets favor precision, the same allocator can also synthesize a node on-the-fly by drawing from its huge-page arena and constructing just the capacity actually required. Because both paths draw from the same lock-free pool, implementers are free to mix them-biasing toward pre-allocation on latency-critical symbols and toward just-in-time allocation where cache size, TLB coverage, or order-flow volatility make finer granularity more efficient.

SIMD Low-precision Packing in Machine Learning—Because the learner tolerates some relative error, all model scalars can be stored in half-precision (FP16/bfloat16) or lower-precision floating-point numbers. For example, at run time the engine can pack one whole register of them and updates with a single fused multiply-add:

(a) x86-64 AVX-512FP16—32 half-precision values per 512-bit zmm, vfmadd132ph.

(b) Armv8 NEON/SVE—8 (128-bit NEON) to 32 (512-bit SVE) halves per vector, fmla/fmlal.

This halves memory traffic and doubles register utilization versus FP32 while keeping accumulators in FP32 to avoid overflow. The optimization is controlled by one compile-time switch, so the same source builds for AVX-512, AVX2, NEON or SVE without code changes.

Together, the bitmask abstraction delivers pointer-management in constant time, saves cache space, and maintains the strict latency budget demanded by high-performance matching engines.

The invention claimed is:

1. A high-speed matching engine for processing electronic trade orders with ultra-low latency, implemented as computer-executable instructions stored in non-transitory memory and executed by one or more processors, the matching engine comprising:
   (a) a memory-management system configured to allocate a plurality of Data Holder Nodes and at least one Price Level Descriptor;
   (b) wherein each Data Holder Node:
      (i) is assigned a contiguous memory region that is physically contiguous or virtually contiguous via page mapping and aligned to cache-line boundaries;
      (ii) stores a fixed, predetermined maximum number of order objects in contiguously addressable slots within said region, each order object including at least a price value and a quantity value; and
      (iii) includes at least one priority-tracking bitmask that, for each price level represented in the node, indicates whether the node contains the lowest-priority order at that price level and, if present, the particular one of said contiguously addressable slots that holds that order;
   (c) at least one ordered price-level index keyed by a price level value, the index comprising one or more Price Level Descriptors; and, for each Price Level Descriptor, storing:
      (i) metadata for the price level; and
      (ii) a reference to the Data Holder Node containing the lowest-priority order at that price level;
   (d) at least one core-match unit, each operating in a single-threaded execution context for a financial instrument and configured to:
      (i) receive incoming orders;
      (ii) match each incoming order against opposite-side resting orders according to a predetermined priority rule;
      (iii) execute trades;
      (iv) insert any unfilled quantity of the incoming order into one of the Data Holder Nodes; and
      (v) update affected Data Holder Nodes, including the at least one priority-tracking bitmask therein, and the at least one ordered price-level index after each execution, insertion, cancellation, modification, or relocation.

2. The matching engine of claim 1, wherein the memory-management system maintains per-core allocation arenas for Data Holder Nodes, and each core-match unit exclusively allocates and frees Data Holder Nodes from the allocation arena associated with the processor core on which it executes.

3. The matching engine of claim 1, wherein each order object stores, in a descriptor-handle field, a direct reference to the Price Level Descriptor for its price level, and wherein, during cancellation or modification processing, the core-match unit obtains the Price Level Descriptor using only the descriptor-handle field, without performing any key-based search or traversal of the ordered price-level index.

4. The matching engine of claim 1, wherein each update to the at least one priority-tracking bitmask sets or clears a bit at an index derived from a slot identifier of an affected order in a node-local bitmask field, without iterating over any other order stored in the node, and completes in time independent of a count of orders stored in the node.

5. The matching engine of claim 1, wherein the memory-management system enforces a node-capacity policy that specifies, for each depth measured from a head-of-book position, a maximum number of orders per Data Holder Node, the policy being monotone non-increasing with depth.

6. The matching engine of claim 5, wherein the node-capacity policy is maintained on a per-core basis, a per-non-uniform-memory-access (NUMA)-node basis, a global basis, or any combination thereof.

7. The matching engine of claim 5, wherein the memory-management system is further configured, in response to each revision of the node-capacity policy, to
   (a) allocate additional pre-constructed Data Holder Nodes whose maximum capacities correspond to the revised policy; and
   (b) retire or repurpose pre-constructed Data Holder Nodes whose capacities no longer conform to the revised policy,
   thereby keeping node size classes aligned with real-time order-flow conditions.

8. The matching engine of claim 1, wherein the at least one core-match unit is configured to insert any unfilled quantity of the incoming order into a Data Holder Node using an Append operation or a Prepend operation, wherein:
   (a) in an Append operation, the at least one core-match unit inserts the incoming order immediately after a point of reference;
   (b) in a Prepend operation, the at least one core-match unit inserts the incoming order immediately before a point of reference; and
   (c) for each such insertion, the at least one core-match unit determines the point of reference at the time of that insertion in accordance with the predetermined priority rule.

9. The matching engine of claim 8, wherein, upon determining that the insertion would exceed a capacity of a target Data Holder Node, the at least one core-match unit executes a relocation cascade comprising zero or more hops in a single direction, and:
   (a) for an Append insertion, executes a Push Back cascade in which each hop relocates a lowest-priority order from a current Data Holder Node to an immediately succeeding Data Holder Node;
   (b) for a Prepend insertion, executes a Push Forward cascade in which each hop relocates a highest-priority order from a current Data Holder Node to an immediately preceding Data Holder Node; and
   (c) in either case, inserts the relocated order into the destination Data Holder Node at a position that preserves the predetermined priority ordering across all nodes, with a zero-hop case allocating a new Data Holder Node at a cascade boundary to accommodate the order.

10. The matching engine of claim 1, further comprising at least one lookup structure keyed by order identifiers and accessible to the at least one core-match unit, each entry storing a reference to the Data Holder Node that currently holds the corresponding order.

11. The matching engine of claim 1, wherein the memory-management system allocates memory in large contiguous blocks selected from 2 MB, 1 GB, or any hardware-supported huge-page sizes, thereby reducing translation lookaside buffer misses.

12. The matching engine of claim 1, wherein each Data Holder Node further includes metadata storing one or both of:
   (a) a current count of orders in the node; and
   (b) references to adjacent Data Holder Nodes in a doubly- or singly-linked structure.

13. The matching engine of claim 1, wherein each ordered price-level index is a balanced search tree keyed by a price level value, thereby providing logarithmic time insertion and search operations.

14. The matching engine of claim 1, further comprising at least one non-blocking queue having payload slots sized and aligned to a processor cache-line width, the queue operatively coupled between the at least one core-match unit and one or more other threads and configured to transport order-related messages including incoming orders, order acknowledgments, and trade confirmations, wherein enqueue and dequeue operations that execute when the queue is neither empty nor full proceed without acquiring a mutual-exclusion lock.

15. The matching engine of claim 1, further comprising a cache-warming logic configured to prefetch Data Holder Nodes, Price Level Descriptors, or order-related message objects into a processor's cache and to align memory accesses with hardware cache-line boundaries to minimize cache misses.

16. The matching engine of claim 1, wherein the at least one core-match unit is configured to execute vector-instruction copy operations implemented as single-instruction-multiple-data (SIMD) instructions to transfer cache-line-aligned blocks of data comprising contiguous sequences of order objects or order-related message objects, during one or more of the following operations:
   (a) realignment of order objects within a Data Holder Node;
   (b) copying or relocating one or more order objects, one or more Price Level Descriptor objects, or both;
   (c) updating price-level metadata including an array of Price Level Pointers or a bitmask that encodes extremal slots; and
   (d) moving order-related messages between threads in embodiments that employ inter-thread message movement;
   thereby reducing memory-move latency.

17. The matching engine of claim 5, wherein the node-capacity policy is parameterized by a node-hit probability model comprising elements selected from the group consisting of:
   (a) a parameterized analytic component configured to compute a hit probability as a function of node depth, one or more system parameters, and observed order-flow statistics;
   (b) a machine-learning estimator configured to output the hit probability; and combinations thereof; wherein the machine-learning estimator is configured to provide at least one of:
      (i) directly output the hit probability from input features;
      (ii) estimate one or more of said system parameters for the analytic component;
      (iii) provide a residual or calibration to the analytic component; or
      (iv) produce an ensemble output with the analytic component.

18. The matching engine of claim 17, wherein parameters of the node-hit probability model are updated online by a stochastic-gradient algorithm executed with vector instructions.

19. The matching engine of claim 1, wherein:
   (a) the at least one priority-tracking bitmask further indicates, for each price level represented in a Data Holder Node, whether the node contains the highest-priority order at that price level and, if present, identifies the particular one of said contiguously addressable slots that holds that order; and
   (b) each Price Level Descriptor further stores a reference to the Data Holder Node containing the highest-priority order at that price level.

20. The matching engine of claim 1, further comprising an auxiliary hash map separate from the ordered price-level index, the hash map keyed by a price level value and mapping to a reference to the corresponding Price Level Descriptor, the matching engine being configured to update the hash map in synchrony with insertions and removals in the at least one ordered price-level index.

21. A computer-implemented method for processing electronic trade orders with ultra-low latency in a high-speed matching engine, the method comprising:
   (a) allocating, by a memory-management system executed by one or more processors, a plurality of Data Holder Nodes and at least one Price Level Descriptor;
   (b) for each Data Holder Node:
      (i) assigning a contiguous memory region, each said region physically contiguous or virtually contiguous via page mapping and aligned to cache-line boundaries;
      (ii) storing, in contiguously addressable slots within said region, a fixed, predetermined maximum number of order objects, each order object including at least a price value and a quantity value; and
      (iii) maintaining at least one priority-tracking bitmask that, for each price level represented in the node, indicates whether the node contains the lowest-priority order at that price level and, if present, identifies the particular one of said contiguously addressable slots that holds that order;
   (c) constructing at least one ordered price-level index keyed by a price level value, the index comprising one or more Price Level Descriptors; and, for each Price Level Descriptor, storing:
      (i) metadata for the price level; and
      (ii) a reference to the Data Holder Node containing the lowest-priority order at that price level;
   (d) operating at least one single-threaded core-match unit to:
      (i) receive incoming orders;
      (ii) match each incoming order against opposite-side resting orders according to a predetermined priority rule;
      (iii) execute trades;
      (iv) insert any unfilled quantity of the incoming order into one of the Data Holder Nodes; and
      (v) update affected Data Holder Nodes, including the at least one priority-tracking bitmask therein, and the at least one ordered price-level index after each execution, insertion, cancellation, modification, or relocation.

22. The method of claim 21, wherein step (σ) further comprises maintaining, by the memory-management system, per-core allocation arenas for Data Holder Nodes; and for each core-match unit:
  (a) allocating each Data Holder Node used by that core-match unit exclusively from the allocation arena associated with the processor core on which that core-match unit executes; and
  (b) freeing each such Data Holder Node back to the same allocation arena, such that allocation and free operations for a given Data Holder Node are performed only via the allocation arena associated with that core-match unit.

23. The method of claim 21, further comprising decoupling the at least one core-match unit from one or more other threads by enqueueing incoming orders to, and dequeuing order acknowledgments and trade confirmations from, at least one non-blocking queue having payload slots sized and aligned to a processor cache-line width, the queue operating on an enqueue and dequeue fast path without acquiring a mutual-exclusion lock.

24. The method of claim 21, wherein step (σ) further comprises, for each core-match unit, allocating at least one contiguous memory page whose size is selected from a plurality of hardware-supported page sizes in accordance with an estimated memory requirement for that core-match unit, thereby reducing translation-look-aside-buffer misses and limiting unused memory space.

25. The method of claim 21, wherein operating the at least one single-threaded core-match unit comprises executing vector-instruction copy operations implemented as single-instruction-multiple-data (SIMD) instructions to transfer cache-line-aligned blocks of data comprising contiguous sequences of order objects or order-related message objects, during one or more of the following operations:
  (a) realignment of order objects within a Data Holder Node;
  (b) copying or relocating one or more order objects, one or more Price Level Descriptor objects, or both;
  (c) updating price-level metadata including an array of Price Level Pointers or a bitmask that encodes extremal slots; and
  (d) moving order-related messages between threads in embodiments that employ inter-thread message movement;
  thereby reducing memory-move latency.

26. The method of claim 21, wherein inserting any unfilled quantity of the incoming order into one of the Data Holder Nodes is performed by an insertion primitive selected from the group consisting of:
  (a) Append, which inserts the order immediately after a point of reference; and
  (b) Prepend, which inserts the order immediately before a point of reference;
  wherein, for each insertion, the point of reference is determined in accordance with the predetermined priority rule.

27. The method of claim 26, wherein, upon determining that the selected insertion would exceed a capacity of a target Data Holder Node, the operating core-match unit executes a relocation cascade comprising zero or more hops in a single direction, and wherein:
  (a) for an Append insertion, the core-match unit executes a Push Back cascade in which each hop relocates a lowest-priority order from a current Data Holder Node to an immediately succeeding Data Holder Node;
  (b) for a Prepend insertion, the core-match unit executes a Push Forward cascade in which each hop relocates a highest-priority order from a current Data Holder Node to an immediately preceding Data Holder Node; and
  in either case, at each hop the relocated order is inserted within the destination Data Holder Node at a position that preserves the predetermined priority ordering across all nodes, with a zero-hop case assigning a new Data Holder Node at a cascade boundary to accommodate the order.

28. The method of claim 21, wherein the step of updating the at least one priority-tracking bitmask comprises:
  (a) setting or clearing a bit at an index derived from a slot identifier of an affected order;
  (b) performing the setting or clearing of the bit without iterating over any other order stored in the node; and
  (c) completing the update in a time that is independent of a count of orders stored in the node.

29. The method of claim 21, wherein the step of updating further comprises:
  (c) maintaining the at least one priority-tracking bitmask to further indicate, for each price level represented in the Data Holder Node, whether the node contains the highest-priority order at that price level and, if present, identify the particular one of said contiguous addressable slots that holds that order; and
  (d) storing, in each Price Level Descriptor, a reference to the Data Holder Node containing the highest-priority order at that price level.

30. A non-transitory computer-readable storage medium storing computer-executable instructions that, when executed by one or more processors, cause the processors to perform operations for processing electronic trade orders with ultra-low latency in a high-speed matching engine, the operations comprising:
  (a) allocating, by a memory-management system executed by one or more processors, a plurality of Data Holder Nodes and at least one Price Level Descriptor;
  (b) for each Data Holder Node:
    (i) assigning a contiguous memory region, each said region physically contiguous or virtually contiguous via page mapping and aligned to cache-line boundaries;
    (ii) storing, in contiguously addressable slots within said region, a fixed, predetermined maximum number of order objects, each order object including at least a price value and a quantity value; and
    (iii) maintaining at least one priority-tracking bitmask that, for each price level represented in the node, indicates whether the node contains the lowest-priority order at that price level and, if present, identifies the particular one of said contiguously addressable slots that holds that order;
  (c) constructing at least one ordered price-level index keyed by a price level value, the index comprising one or more Price Level Descriptors; and, for each Price Level Descriptor, storing:
    (i) metadata for the price level; and
    (ii) a reference to the Data Holder Node containing the lowest-priority order at that price level; and
  (d) operating at least one single-threaded core-match unit to:
    (i) receive incoming orders;
    (ii) match each incoming order against opposite-side resting orders according to a predetermined priority rule;
    (iii) execute trades;

(iv) insert any unfilled quantity of the incoming order into one of the Data Holder Nodes; and
(v) update affected Data Holder Nodes, including the at least one priority-tracking bitmask therein, and the at least one ordered price-level index after each execution, insertion, cancellation, modification, or relocation.

\* \* \* \* \*